United States Patent
Cook, III

(10) Patent No.: US 6,230,165 B1
(45) Date of Patent: May 8, 2001

(54) METHOD FOR ENCODING AND TRANSPORTING DATABASE OBJECTS OVER BANDWIDTH CONSTRAINED NETWORKS

(75) Inventor: John L. Cook, III, Southborough, MA (US)

(73) Assignee: Cerulean, Marlborough, MA (US)

( * ) Notice: Subject to any disclaimer, the term of this patent is extended or adjusted under 35 U.S.C. 154(b) by 0 days.

(21) Appl. No.: 09/174,280

(22) Filed: Oct. 16, 1998

(51) Int. Cl.⁷ ........................................ G06F 12/00
(52) U.S. Cl. .................... 707/201; 709/203; 709/219
(58) Field of Search .................... 709/217, 218, 709/219, 229, 216, 247; 707/200, 201, 203, 513, 104

(56) References Cited

U.S. PATENT DOCUMENTS

| | | | |
|---|---|---|---|
| 5,706,435 | * 1/1998 | Barbara et al. | 707/201 |
| 5,734,898 | * 3/1998 | He | 707/203 |
| 5,829,001 | * 10/1998 | Li et al. | 707/10 |
| 5,857,203 | * 1/1999 | Kauffman et al. | 707/200 |
| 5,870,759 | * 2/1999 | Bauer et al. | 707/201 |
| 5,895,471 | * 4/1999 | King et al. | 707/104 |
| 5,898,836 | * 4/1999 | Freivald et al. | 707/513 |
| 5,931,904 | * 8/1999 | Banga et al. | 709/217 |
| 5,946,697 | * 8/1999 | Shen | 709/218 X |
| 5,991,760 | * 11/1999 | Gauvin et al. | 709/217 |
| 5,999,947 | * 12/1999 | Zollinger et al. | 707/203 |
| 6,003,087 | * 12/1999 | Housel, III et al. | 709/229 |
| 6,119,155 | * 9/2000 | Rossmann et al. | 709/219 |

OTHER PUBLICATIONS

Tim Hylan, Unwired Planet, "Handheld Device Markup Language FAQ", http://www.w3.org/TR/, Apr. 1997, 4 pages.*

Peter King et al. ed., Unwired Planet, "Handheld Device Markup Language Specification", http://www.w3.org/TR/, May 1997, 33 pages.*

* cited by examiner

*Primary Examiner*—Ayaz Sheikh
*Assistant Examiner*—Patrice Winder
(74) *Attorney, Agent, or Firm*—McGlew and Tuttle, P.C.

(57) ABSTRACT

A method of transferring information across a computer network with a server and a client. The information is divided into a plurality of cards and a plurality of card forms. Each card includes a plurality of values. Each card form corresponds to one of the cards and includes a description of the values of a corresponding card. The cards and the card forms are stored in a server data base on the server and a client data base on the client. The information in the server is changed or replaced by attaching a card delta to one of the cards. The card delta indicates which information in the respective card is to be replaced. The card deltas are transferred between the client data base and the server data base when data bases are to be updated.

9 Claims, 36 Drawing Sheets

```
Header = SEQUENCE
{
    key         OCTET STRING
    owner       CardReference,
    observers   Observers
}

Observers ::= CHOICE
{
    NULL,
    SEQUENCE OF OCTET STRING
}
```

| header |  |
|---|---|
| key |  |
| owner |  |
| observers |  |
|  | observer (0) |
|  | observer (1) |

Figure 6.1

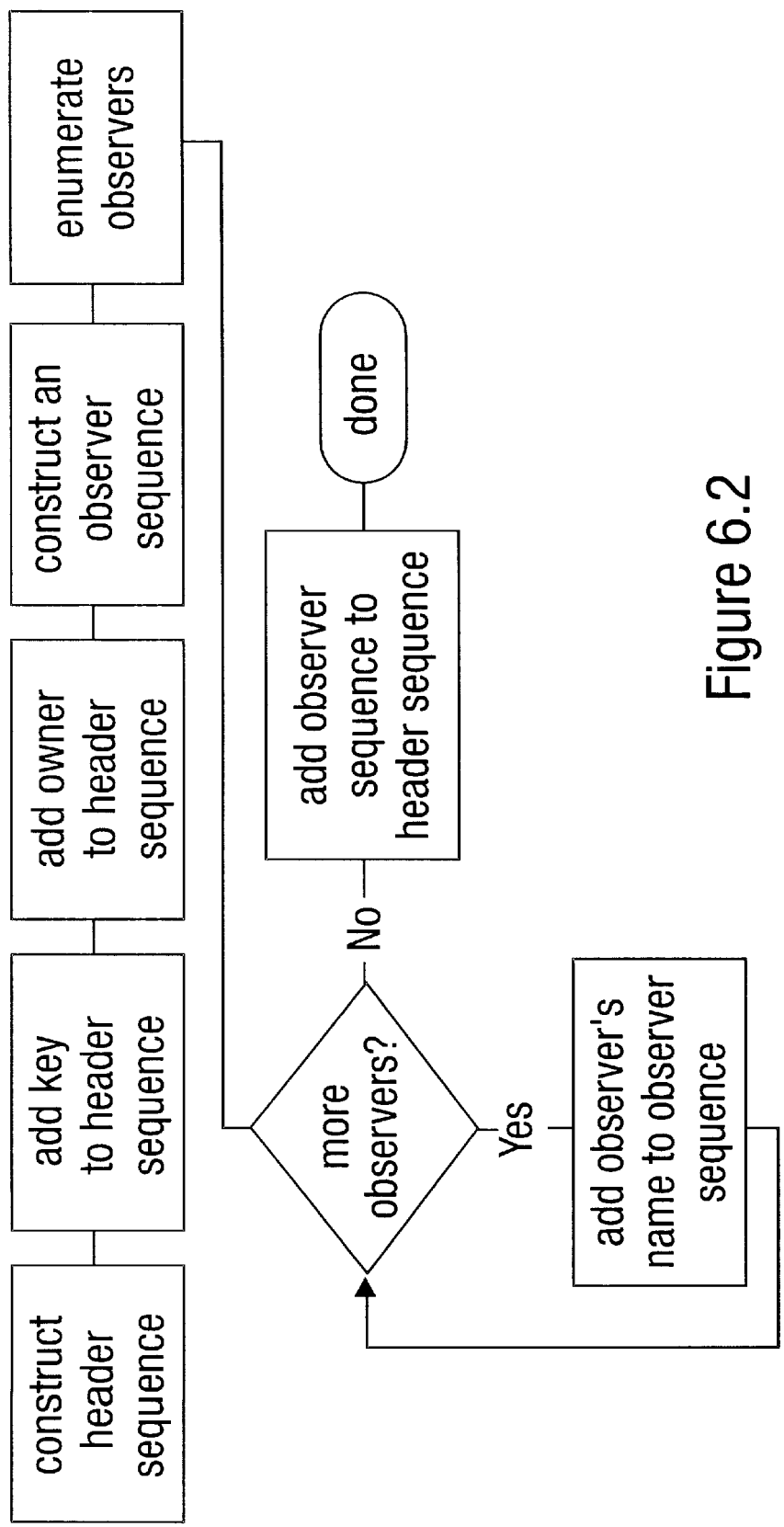
Figure 6.2

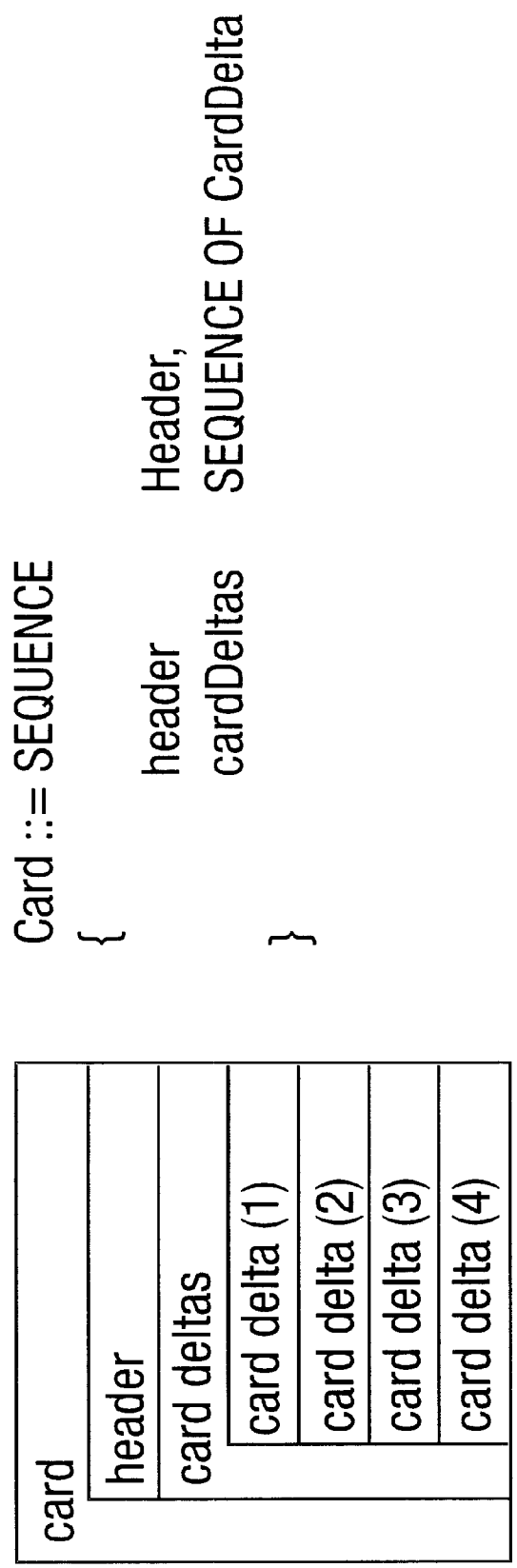
Figure 7.1

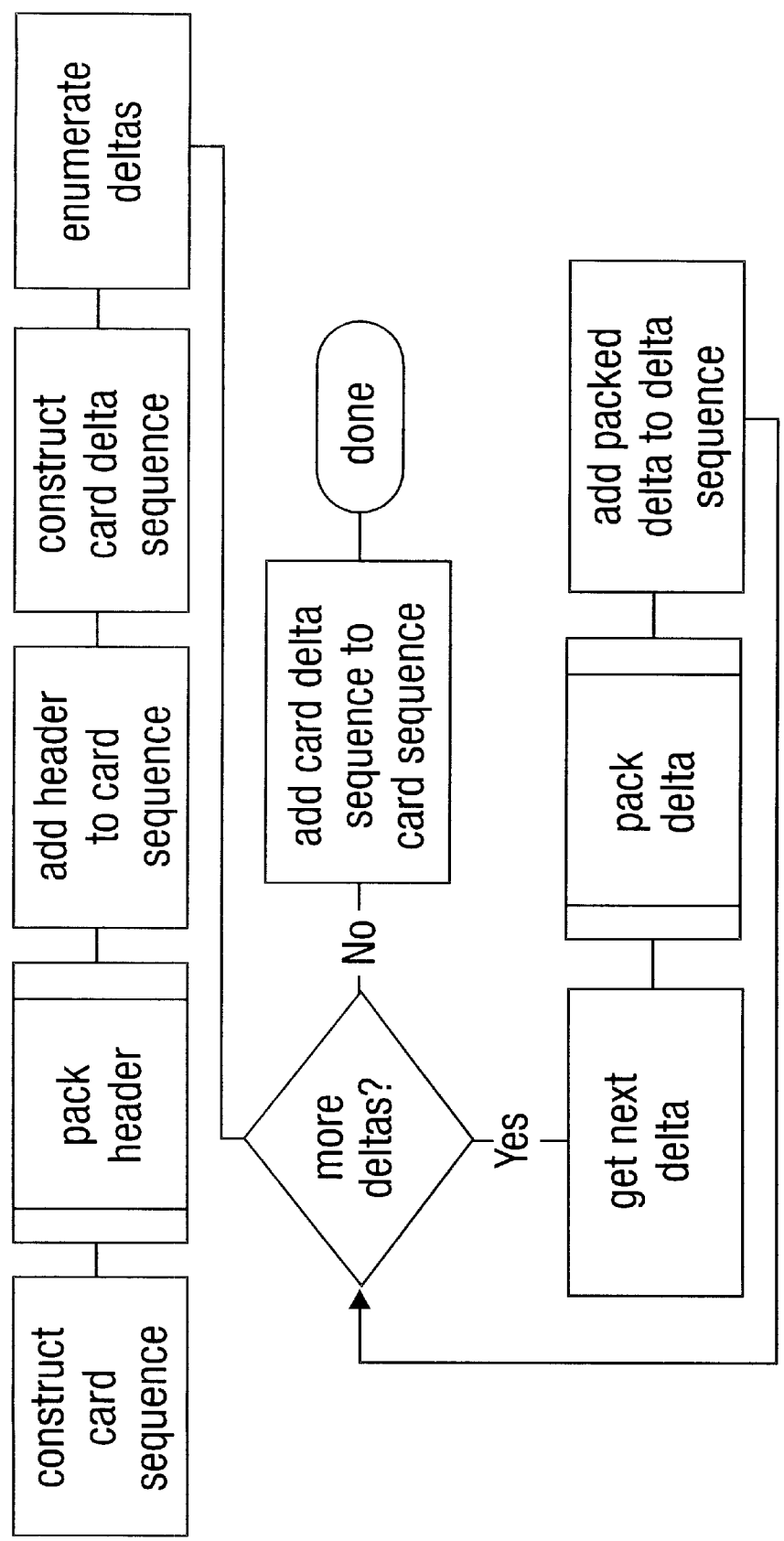
Figure 7.2

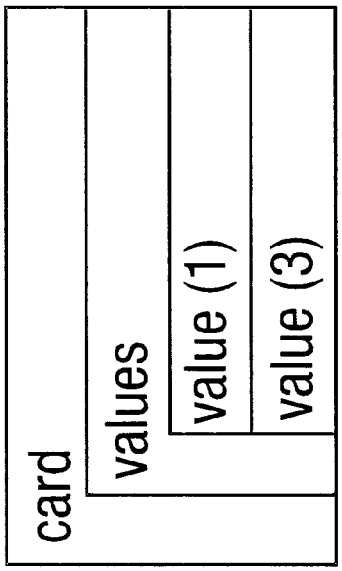
Figure 8.1

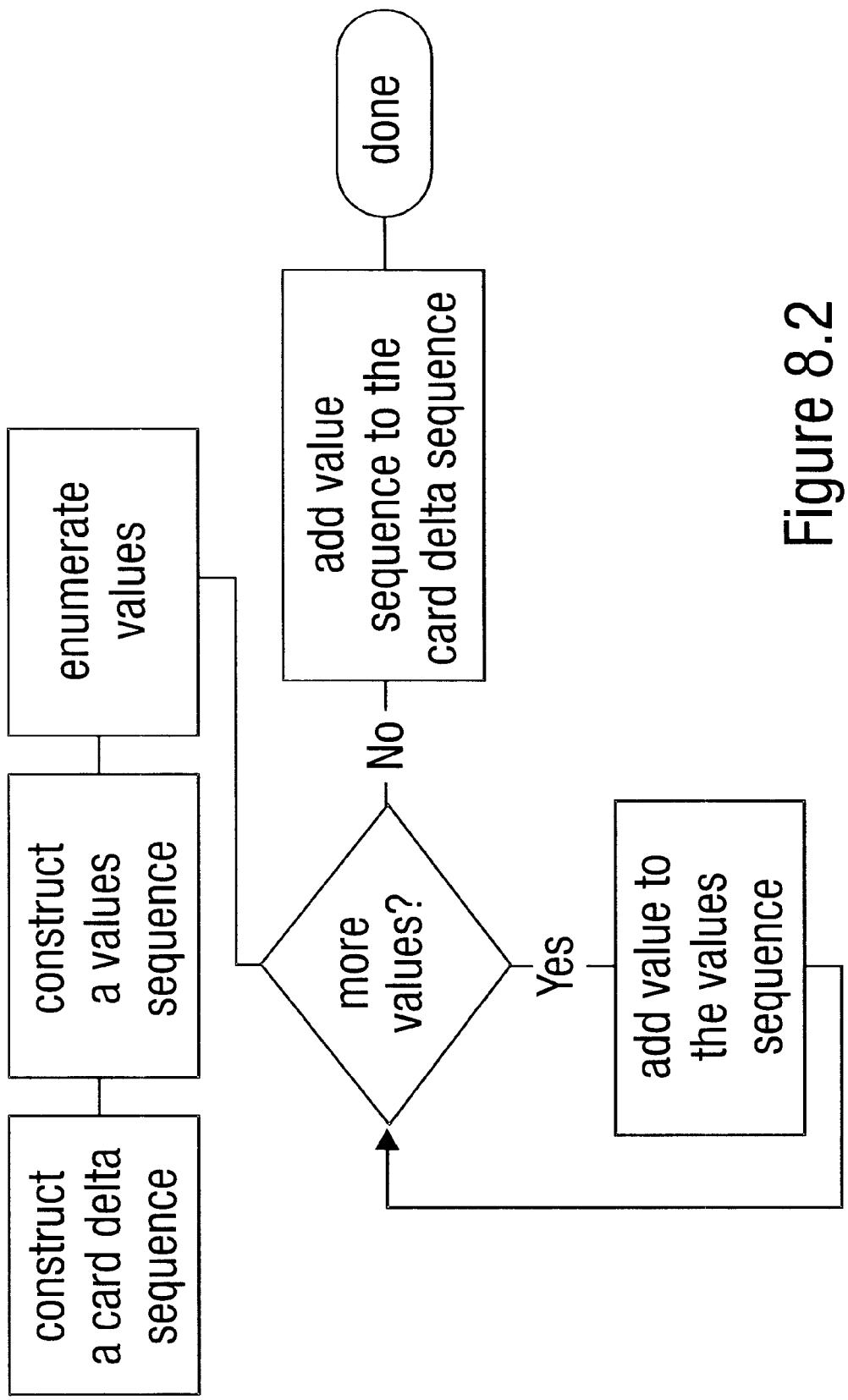
Figure 8.2

| card form |
|---|
| header |
| value specifications |
| value spec (0) |
| value spec (1) |
| value spec (2) |
| value spec (3) |

```
CardForm ::= SEQUENCE
{
    header       Header,
    valueSpecs   SEQUENCE OF ValueSpecifications
}

ValueSpecifications ::= CHOICE
{
    VSInteger,
    VSFloat,
    VSBoolean,
    VSDate,
    VSTime,
    VSString
}
```

Figure 9.1

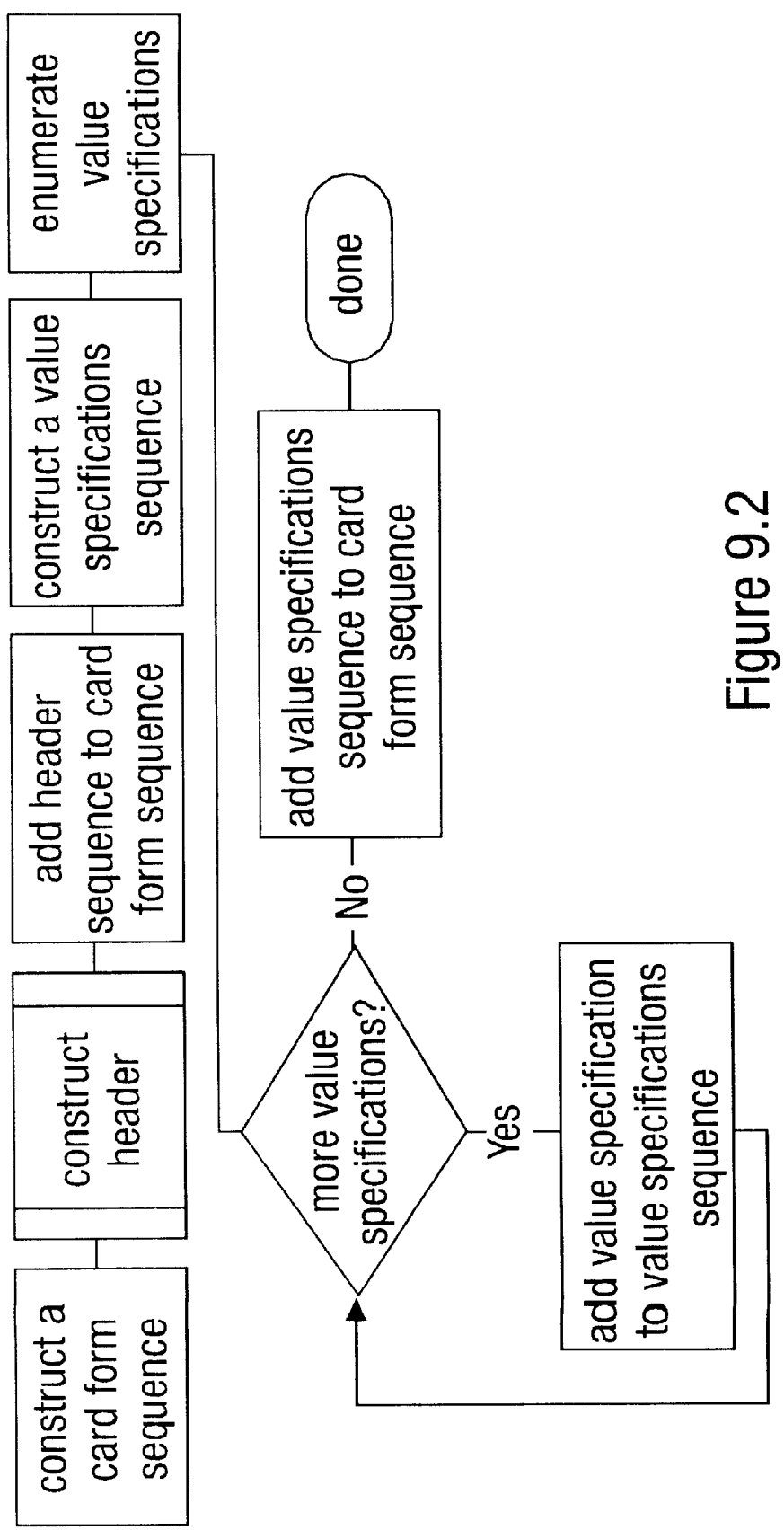
Figure 9.2

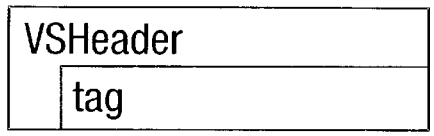
```
VSHeader :: = SEQUENCE
{
        tag          OCTET STRING,
}
```
Figure 10.1
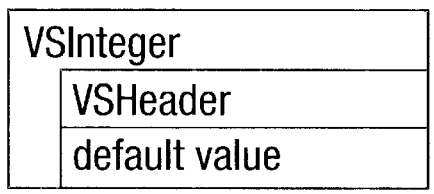
```
VSInteger :: = SEQUENCE
{
        header    VSHeader,
        default   OptionalInteger
}
OptionalInteger ::= CHOICE
{
        NULL,
        INTEGER
}
```
Figure 10.2

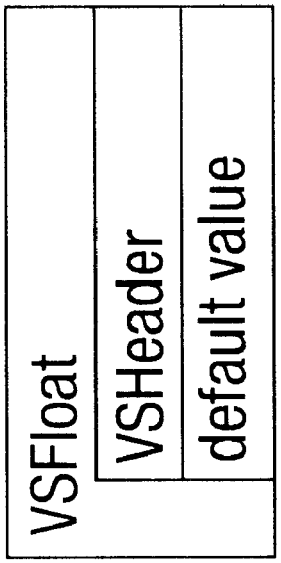
Figure 10.3

```
VSBoolean ::= SEQUENCE
{
    header    VSHeader,
    default   Boolean
}
Boolean ::= CHOICE
{
    false    [APPLICATION 0] IMPLICIT NULL,
    true     [APPLICATION 1] IMPLICIT NULL
}
```
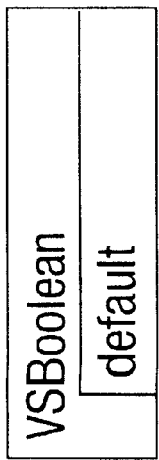
Figure 10.4

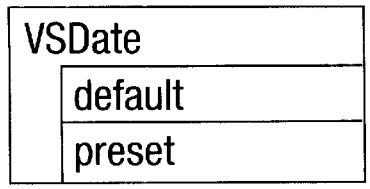
```
VSDate :: = SEQUENCE
{
        header      VSHeader,
        default     INTEGER
                    {
                            preset (0),
                            none (1),
                            current (2)
                    }
        preset      OptionalInteger
}
```
Figure 10.5
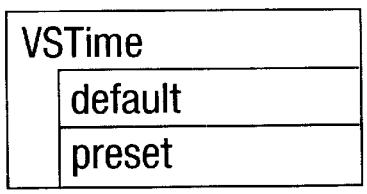
```
VSTime :: = SEQUENCE
{
        header      VSHeader
        default     INTEGER
                    {
                            preset (0),
                            none (1),
                            current (2)
                    }
        preset      OptionalInteger
}
```
Figure 10.6

| VSString |
|---|
| makeUpper |
| type |
| default |
| preset |

```
VSString :: = SEQUENCE
{
        header          VSHeader,
        makeUpper       Boolean,
        type            INTEGER
                        {
                                normal (0),
                                password (1)
                        }
        default         INTEGER
                        {
                                preset (0),
                                none (1),
                                guid (2)
                        }
        preset          OptionalString
}

OptionalString ::= CHOICE
{
        NULL,
        OCTET STRING
}
```

Figure 10.7

```
Stack ::= SEQUENCE
{
    header       Header,
    card         Card,
    stackDeltas  SEQUENCE OF StackDelta
}

OptionalStackDelta ::= CHOICE
{
    NULL,
    StackDelta
}
```

| stack |
|---|
| header |
| card |
| stack deltas |
|   stack delta (1) |
|   stack delta (2) |
|   stack delta (3) |
|   stack delta (4) |

Figure 11.1

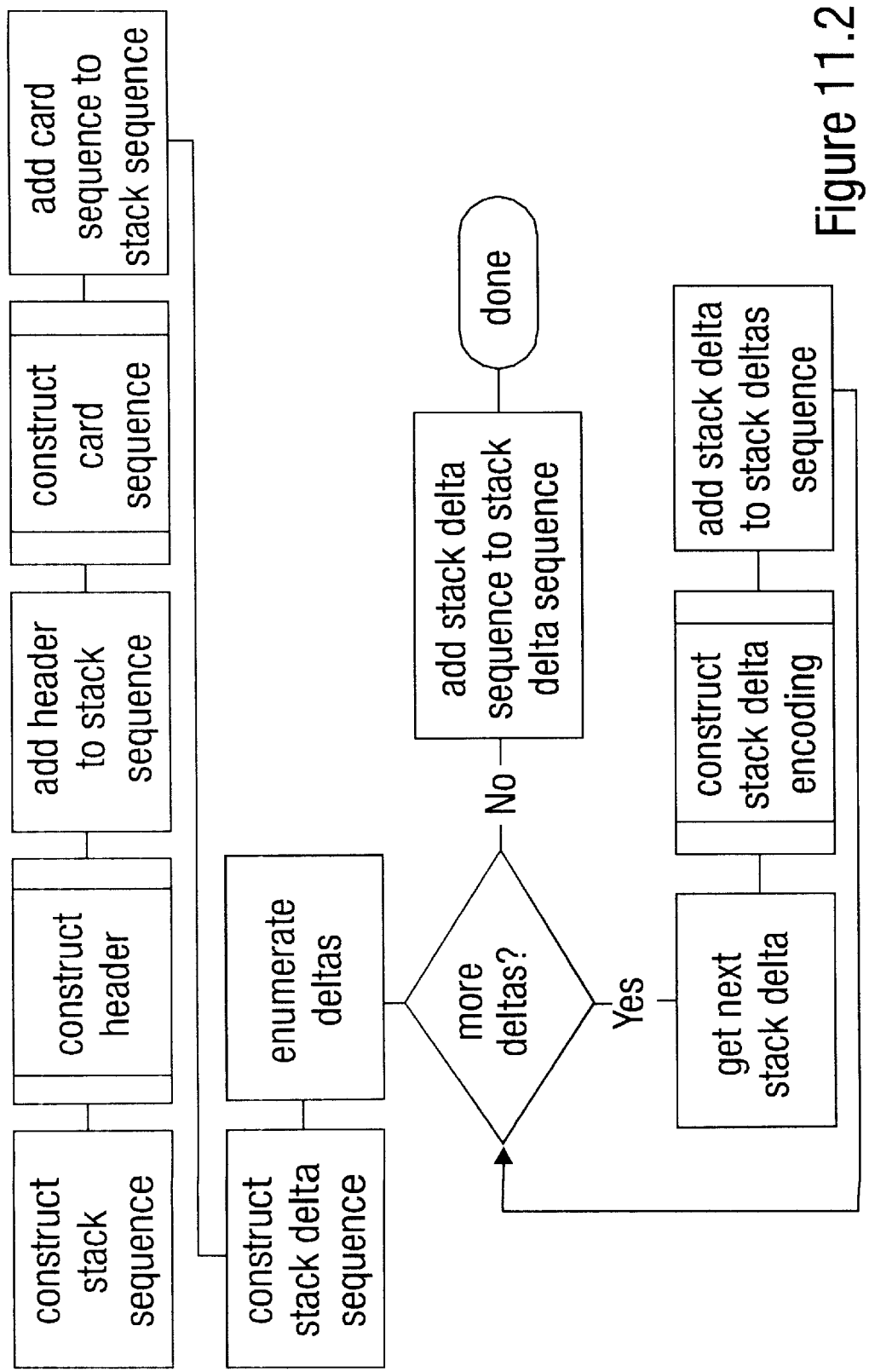
Figure 11.2

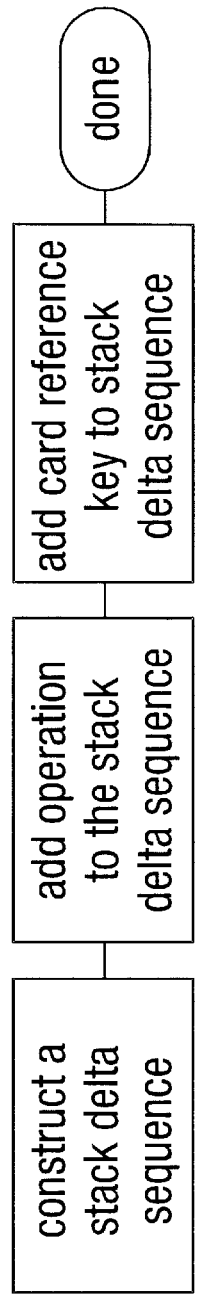
| stack delta |
|---|
| operation |
| card reference |
```
stackDelta ::= SEQUENCE
{
    operation     INTEGER
    {
        add (0),
        modify (1),
        remove (2)
    },
    cardReference  OCTET STRING
}
```
Figure 12.1
Figure 12.2

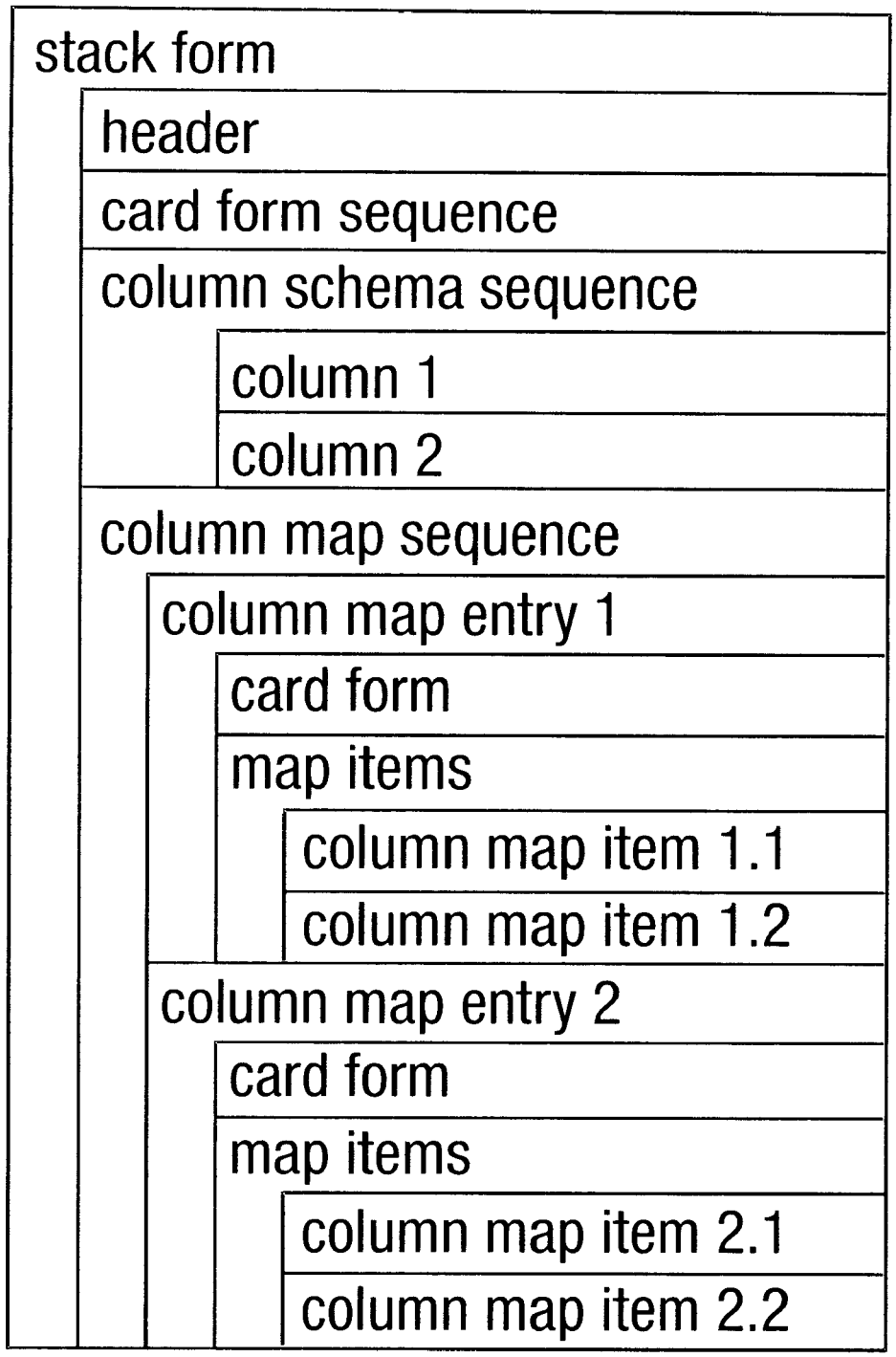
Figure 13.1a

```
stackForm ::= SEQUENCE
{
        header          Header,
        cardForm        CardForm,
        columnSchema    ColumnSchema,
        columnMaps      SEQUENCE OF ColumnMap
}

ColumnSchema ::= SEQUENCE
{
        columns         SEQUENCE OF INTEGER
}

ColumnMap ::= SEQUENCE
{
        cardForm        OCTET STRING,
        mapItems        SEQUENCE OF ColumnMapItem
}

ColumnMapItem ::= SEQUENCE
{
        columnIndex     INTEGER,
        valueIndex      INTEGER
}
```

Figure 13.1b

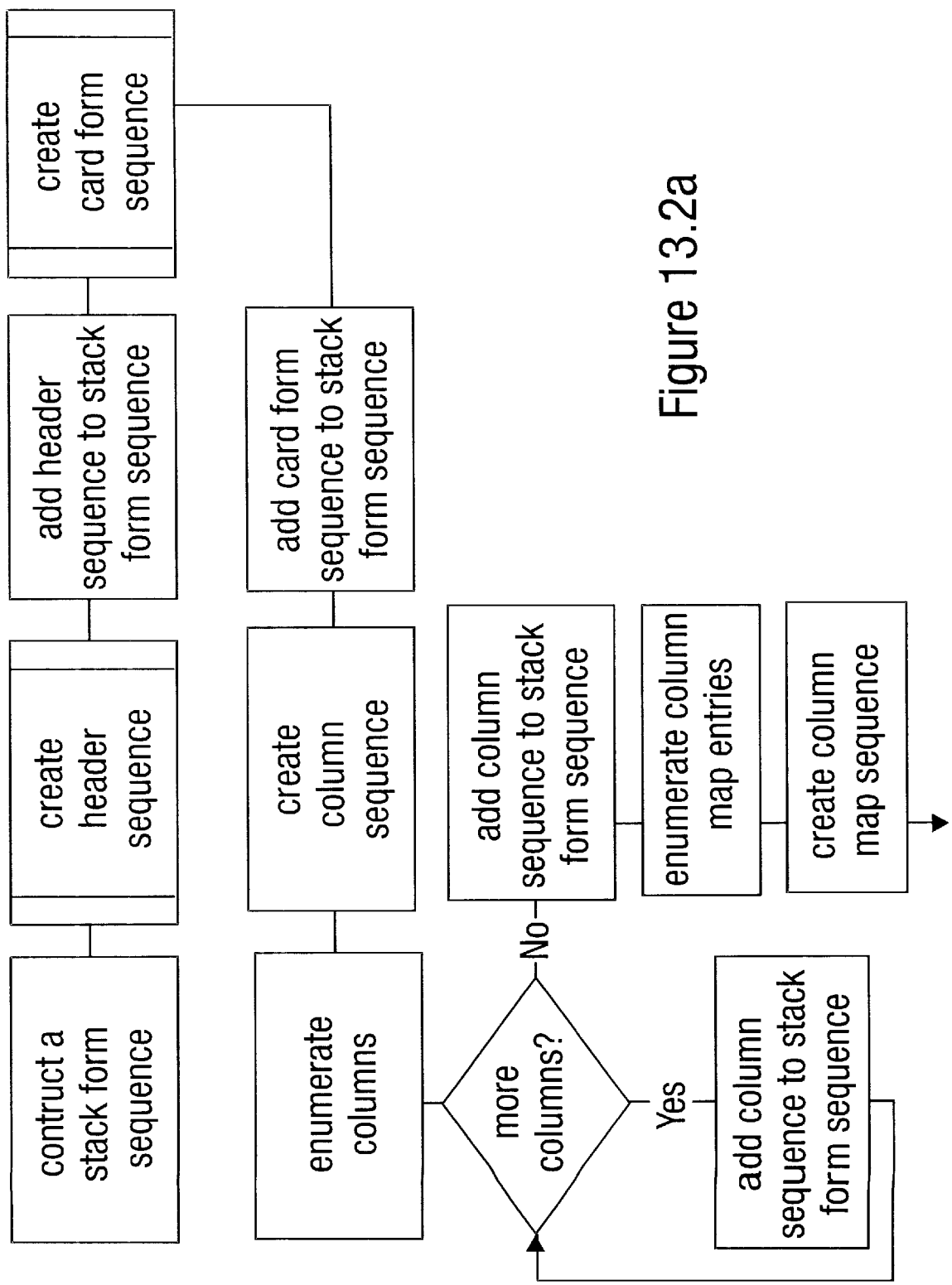
Figure 13.2a

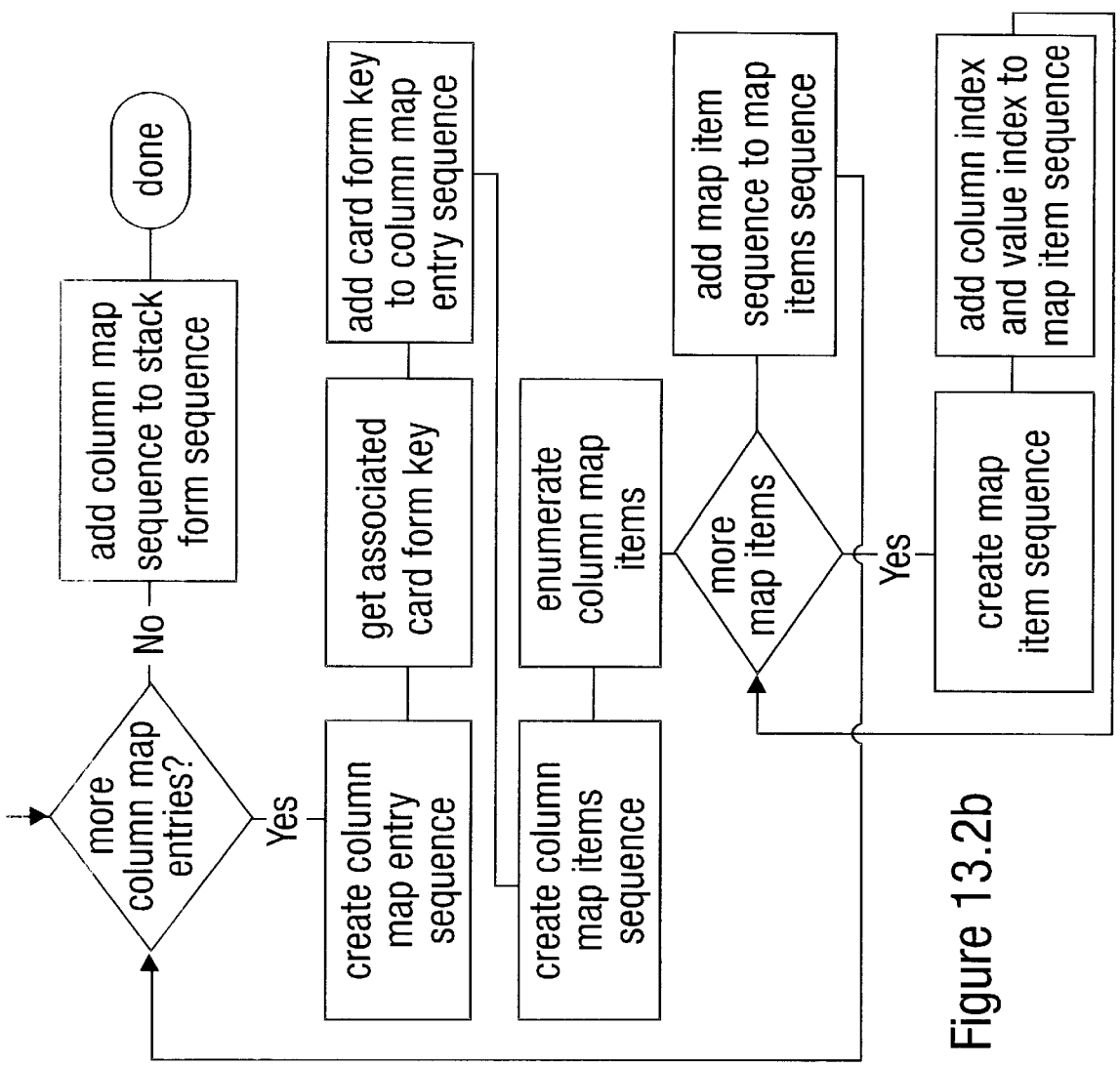
Figure 13.2b

```
ErrorResponse ::= [0] IMPLICIT SEQUENCE
{
    errorCode    INTEGER
    {
        authentication (0),
        access (1),
        exists (2)
    }
}

AddAcknowledgement ::= [1] IMPLICIT NULL
```

```
AddObjectRequest ::= [0] IMPLICIT SEQUENCE
{
    dbObject    DBObject
}

DBObject ::= CHOICE
{
    Card,
    Stack,
    CardForm,
    StackForm
}
```

Figure 14b

ErrorResponse ::= [0] IMPLICIT SEQUENCE
{
    errorCode    INTEGER
                 {
                     authentication (0),
                     access (1)
                 }
}

AddAcknowledgement ::= [1] IMPLICIT NULL
{
    NULL,
    SEQUENCE OF CardDelta
}

AddCardDeltaRequest ::= SEQUENCE
{
    key      OCTET STRING,
    delta    CardDelta
}

Figure 15b

```
AddCardDeltaRequest ::= SEQUENCE
{
    key       OCTET STRING,
    delta     StackDelta
}

ErrorResponse ::= [0] IMPLICIT SEQUENCE
{
    errorCode    INTEGER
    {
        authentication (0),
        access (1)
    }
}

AddAcknowledgement ::= [1] IMPLICIT CHOICE
{
    NULL,
    SEQUENCE OF StackDelta
}
```

Figure 16b

```
ErrorResponse ::= [0] IMPLICIT SEQUENCE
{
    errorCode    INTEGER
    {
        authentication (0),
        access (1),
        exists (2),
        unsupported (3)
    }
}

Acknowledgement ::= [1] IMPLICIT CHOICE
{
    Card,
    Stack,
    CardForm,
    StackForm
}

GetObjectRequest ::= SEQUENCE
{
    key         OCTET STRING,
    overview    Boolean
}
```

Figure 18b

```
RefreshObjectRequest ::= SEQUENCE
{     key              OCTET STRING,
      currentDeltaIndex INTEGER,
      overview         Boolean
}

ErrorResponse ::= [0] IMPLICIT SEQUENCE
{
      errorCode    INTEGER
      {
            authentication (0),
            access (1),
            exists (2),
            unsupported (3)
      }
}

RefreshObjectResponse ::= [1] IMPLICIT CHOICE
{
      SEQUENCE OF CardDelta,
      SEQUENCE OF StackDelta
}
```

Figure 19b

METHOD FOR ENCODING AND TRANSPORTING DATABASE OBJECTS OVER BANDWIDTH CONSTRAINED NETWORKS

FIELD OF THE INVENTION

The present invention relates in general to the accessing of information that is stored on a network server. In particular, the present invention relates to the packaging and transport of information using a method that decreases the amount of network bandwidth required.

BACKGROUND OF THE INVENTION

Traditionally, information on a computer network is transported using a protocol that is understood by the various parties involved. Many of these protocols have evolved as efficient solutions to particular communications problems. Therefore, communications as dictated by the protocol varies as the characteristics of the data and its handling change. Most applications and protocols in operation today are constructed to efficiently process information. That is to say, the emphasis has been placed on the use of system bound resources such as disk space, memory and processor speed. In recent years the focus has moved from system bound resources to the network as a resource. This resource constraint is most evident in wireless networks where bandwidth is limited. While protocols have been developed to improve bandwidth utilization in wireless networks, these protocols improve efficiency using gross methodologies that address network utilization in a general, yet limited way.

SUMMARY AND OBJECTS OF THE INVENTION

It is a primary object of the present invention to apply methodologies at the highest levels of the protocol chain to improve efficiency of communications in bandwidth constrained networks. The present invention accomplishes this objective by involving the application in the goal of reducing the bandwidth required. This involvement is realized in two ways: data representation, and communication of the data representation between client and server applications.

The present invention stores data in a card and stack arrangement. A card is a database record that can be added, modified and deleted. A stack is a logical collection of cards. Essentially, a stack is also a type of data base record and is therefore also a type of card. A logical collection of stacks is therefore another stack. Therefore stacks may logically contain other or sub stacks.

A schema object known as a "card form" describes cards. A card form consists of value specifications that describe the type and format of individual data items represented in an associated card.

A schema object known as a stack form describes stacks. A stack form consists of column schema and column maps. The column schema and column maps describe the organization of a stack based on the stack form. The column schema defines a column in associated stacks. Any value associated with a column implies overview information. Each column map associates the value specifications of a particular card form to a column schema of the stack form. Therefore, this mapping associates values of a card to a column of a stack that refers to it. From a stack prospective, this association determines the values of a card providing an overview. Only overview values are required when viewing a card through an associated stack. An understanding of these relationships allows the present invention to algorithmically determine which values of a card that must be current from a stack's prospective.

Cards include a collection of card deltas that describe the value of one or more card fields at a particular time of change.

Stacks consist of a collection of stack deltas. Stack deltas describe the addition, modification and removal of a given card at a particular time of change.

By using the structures defined above, it is possible to maintain synchronicity between a client and server version of a database containing stacks and cards by transferring individual deltas. Furthermore, by using column schema and column maps it is possible to maintain card deltas in an overview state: alleviating the need to send potentially large values stored in a card delta until the details of the card are required.

When information is initially entered into the server database, it is stored in cards and stacks. As clients request information from the server, they incrementally replicate the portions of the server's database according to interest. The replicated information is stored in the client's personal database until it is algorithmically determined that it is no longer advantageous to do so.

The client uses a pull model transfer to extract information from the server's database. Using the present invention, the transfer of information is achieved by the client's database using four protocol primitives: add, get, refresh and delete. The client's database makes these requests on behalf of the application in sympathy to the application's making request of the database that cannot be directly satisfied. The protocol primitives are directed to the servers database broker.

When the data in the server database is to be updated, the original data is not modified, but instead additional data is added in the form of deltas that indicate which portion of the old data is to be replaced. When the client again requests the same data, only the new deltas are retrieved. Using this method the client application need not request unchanged information multiple times.

The following scenario describes the flow of information into a stack, where the flow of information is unknown to the client database.

Via an end-user interface the user navigates to a stack (e.g., e-mail list).

The client database not recognizing the stack, makes a request of the server broker.

The broker looks up the stack in the server database and replies to the client database with the complete object.

The client, not recognizing the stack form associated with the stack, makes a request of the server broker.

The broker looks up the stack form in the server database and replies to the client database.

For each card indicated by the stack, the client application will be required to get the cards in their overview state according to how their card form maps into the columns via the column map (e.g., most likely all fields except for the body of the e-mail message).

The broker will respond to the overview request for each card.

The client may now display the stack in whatever way is appropriate.

The end-user indicates a desire to see the details of a particular card on the stack (e.g., read an e-mail message).

The client database makes a request to the broker for the particular cards delta based on the known delta level.

The broker responds with the remaining fields of the card (e.g., the body of the e-mail message).

The above-mentioned features of the present invention and the features explained below may be used not only in the described combinations, but the features can also be used individually and/or in other combinations within the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 6 are the schematic (FIG. 6.1) and the ASN.1 (FIG. 6.2) representations of a database object header;

FIGS. 7 are the schematic (FIG. 7.1) and the ASN.1 (FIG. 7.2) representations of a card;

FIGS. 8 are the schematic (FIG. 8.1) and the ASN.1 (FIG. 8.2) representations of a card delta;

FIGS. 9 are the schematic (FIG. 9.1) and the ASN.1 (FIG. 9.2) representations of a card form;

FIGS. 10 are the schematic and ASN.1 representations of several general purpose Value Specifications: VSHeader (FIG. 10.1), VSInteger (FIG. 10.2), VSFloat (FIG. 10.3), VSBoolean (FIG. 10.4), VSTime (FIG. 10.5), VSDate (FIG. 10.6), and VSString (10.7);

FIGS. 11 are the schematic (FIG. 11.1) and the ASN.1 (FIG. 11.2) representations of a stack;

FIGS. 12 are the schematic (FIG. 12.1) and the ASN.1 (FIG. 12.2) representations of a stack delta;

FIGS. 13 are the schematic (FIG. 13.1) and the ASN.1 (FIG. 13.2) representations of a stack form;

DESCRIPTION OF THE PREFERRED EMBODIMENT

Figure 1:
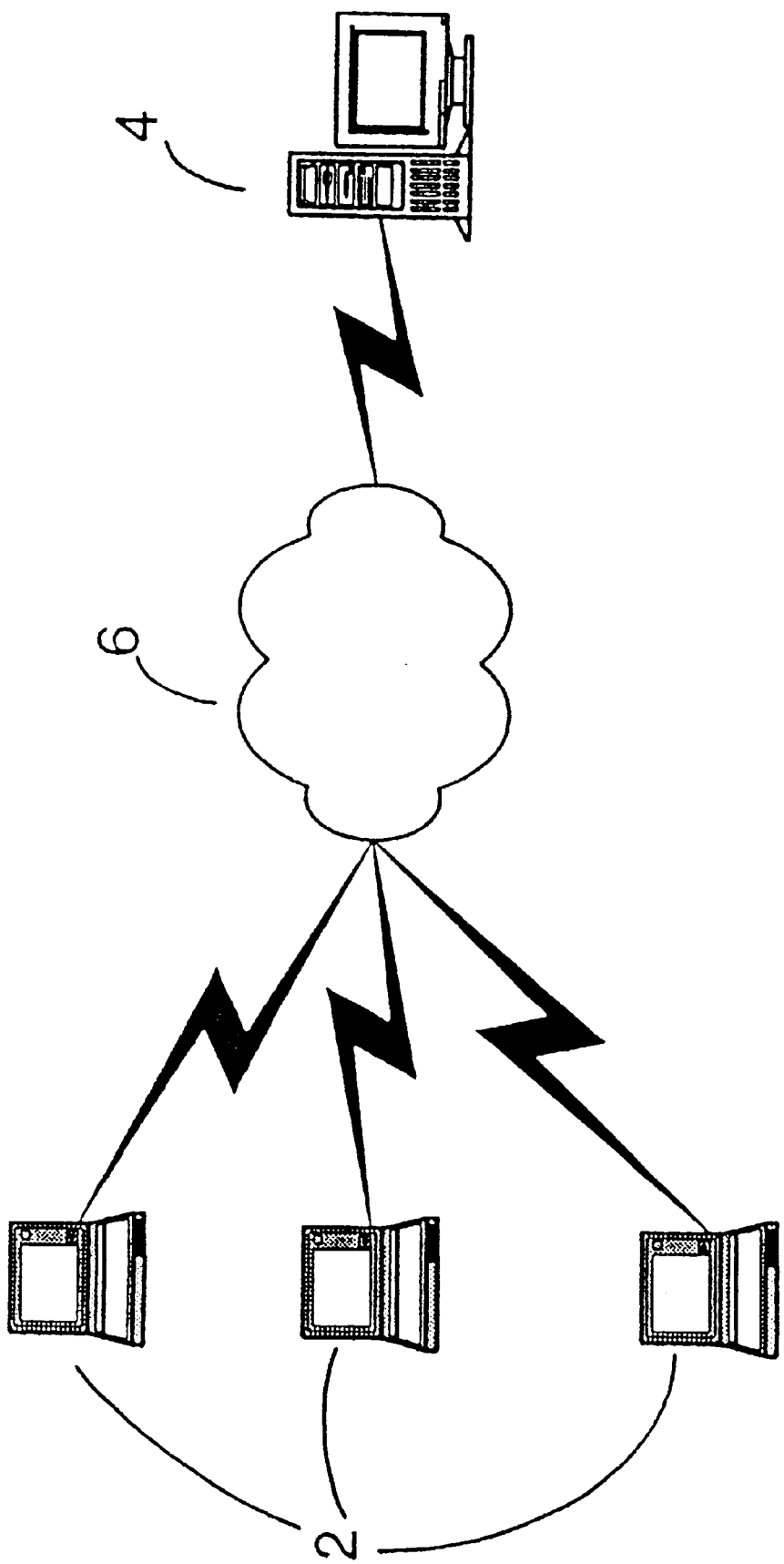
FIG. 1 is a schematic diagram of the client/server network.
Figure 2:
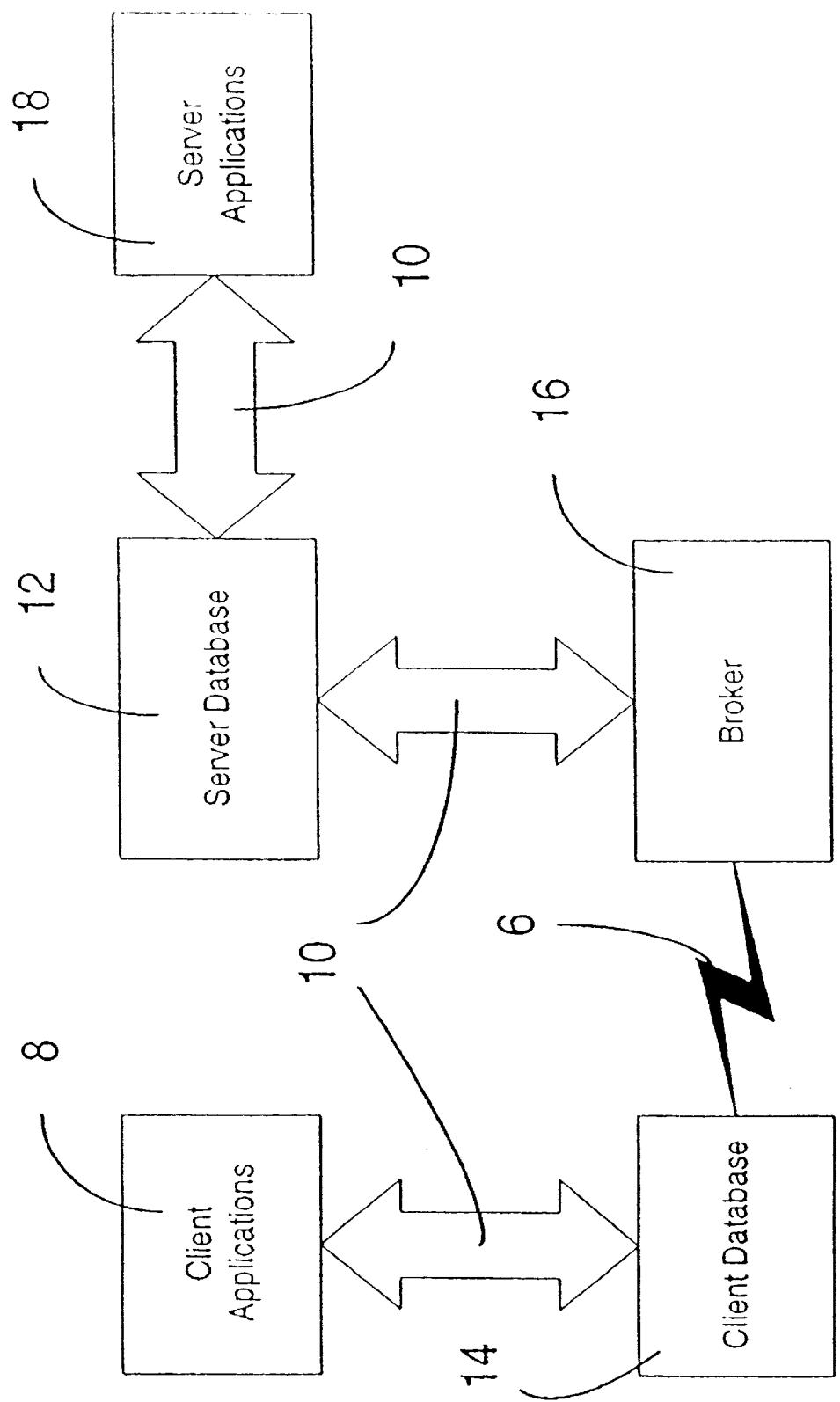
FIG. 2 is a schematic diagram of the client/server subsystems and their interactions.

Referring to the drawings, and in particular to FIG. 1, a plurality of clients 2 are connected to a server 4 by a wireless network 6. The present invention utilizes five subsystems 8, 12, 14, 16, and 18 spread across the clients 2 and server 4 as shown in FIG. 2. The individual client applications 8 communicate directly with the client database 14 via an application programming interface (API) 10. From the point of view of the application 8, the client database 14 is the only database, as the application 8 is not aware of any direct communication between the client 2 and the server 4. The client database 14 pulls data as needed, via the server's broker 16, over a wireless network connection 6. The broker 16 obtains information from the server's database 12 to satisfy the client request using the same type of API 10 used on the client. Server side applications 18 also interact with the database using the same type of API 10.

Figure 3:
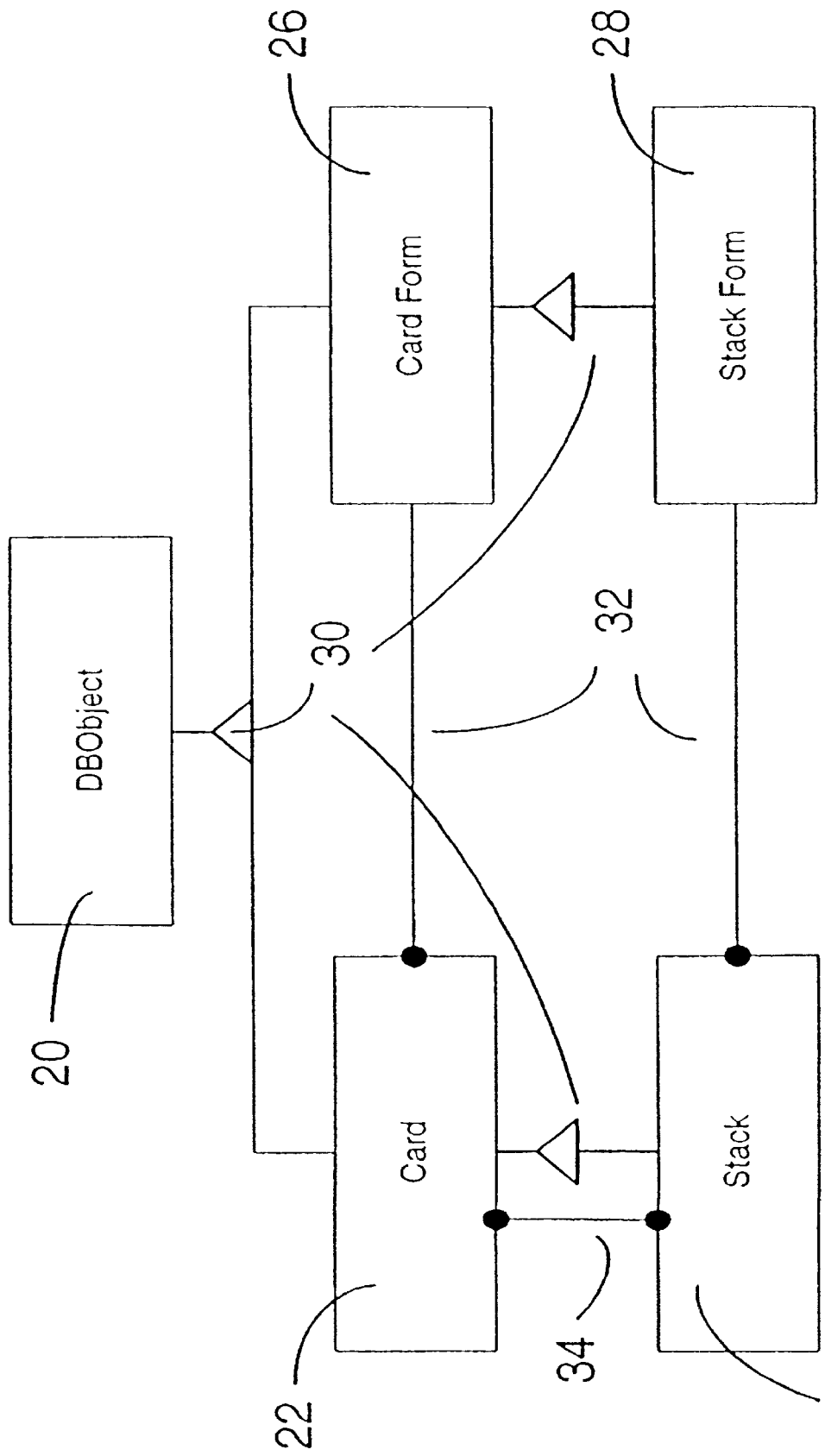
FIG. 3 is an object relationship diagram showing the four primary structures of the present invention's database.

At the most basic level, each of the client databases 14 and the server database 12 contain four data structures as shown in FIG. 3: card, stack, card form and stack form.

The card 22 is a collection of values. For discussion purposes, an example of an e-mail system is used. In this example, a card 22 represents the values associated with a particular e-mail message. The values without type information are of little use to the applications 8, 18. Therefore, information is required on the organization of the values of a card 22. A card form 26 conveys this information on the organization of the values in a card 22. A card form 26 represents each card 22, and each card form may describe multiple cards; hence, there is a one-to-many relationship 32 between card forms 26 and cards 22.

A stack 24 is a collection of cards 22. For each stack, there may be multiple cards, and each card may be associated with multiple stacks; hence, there is a many-to-many relationship 34 between cards 22 and stacks 24. Again, a stack 24 is of limited use unless the relationship between it and its cards 22 is understood. A stack form 28 conveys this information. A stack form 28 represents each stack 24, and the stack form may describe a plurality of stacks 24; hence, there is a one-to-many relationship 32 between stack forms 28 and stacks 24.

Each of the primary structures (card 22, stack 24, card form 26 and stack form 28) are derived from a common abstract structure: DBObject 20. This derivation (as indicated by the inheritance symbol 30) allows these objects to be stored in the databases 12 14, accessed via the API 10 and communicated on the wireless connection 6 between the client database and the broker 16.

The inheritance relationship 30 between card 22 and stack 24 and between card form 26 and stack form 28 provides two additional capabilities to stacks 24. First, it allows stacks 24 to contain stacks. Second, it allows stacks to have values. The values of a stack are referred to as properties of the stack.

As stated above, there are only four primary DBObject 20 derivatives. Each of these requires additional support structures. These support structures are described in the following paragraphs.

Figure 4:
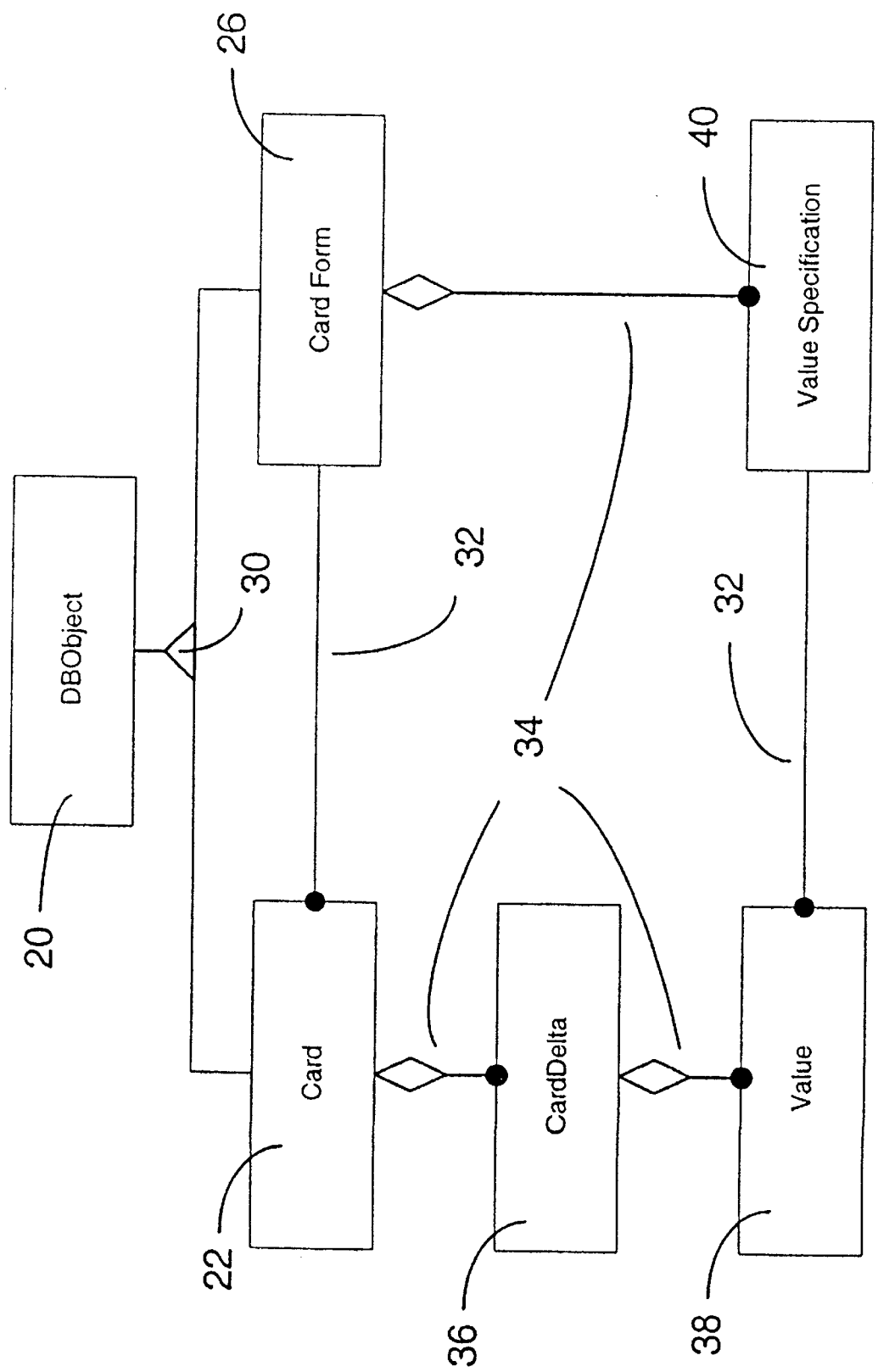
FIG. 4 is an object relationship diagram showing the support structures that relate to cards and card forms.

As depicted in FIG. 4, the card form 26 has a plurality of value specifications 40 (as indicated by the one-to-many aggregate relationship 34). Each value specification 40 describes a value 38 that will exist in a card 22 based on the card form 26 at hand. The zero based index of a particular value specification 40 in a card form 26 implies the zero based index of the corresponding value 38 associated with a card 22.

The card's values 38 are stored in a plurality of card deltas 36. Each card delta 36 is only associated with one card (as shown by the one-to-many aggregation 34). Once a card 22 is obtained from the database, a new card delta 36 is applied to the card 22 when the first value is set. Values 38 are added to the card delta 36 as they are set until the card 22 is stored in the database. For example, when the e-mail application on the server is creating a new e-mail card for a received message, in effect, it applies one delta 36 that contains all of the values 38 associated with that initial version of the card. If the e-mail card contains a readFlag as one of its values, the client would change this value from false (the initial value for unread mail) to true when the user reads the message. At this point, a new card delta 36 would be applied to the card 22. This second card delta would contain only one value: the new value of the readFlag. Since values 38 are sparsely populated in the card delta 36, they must be indexed. This index relates back to the value specification 40 in the card form 26.

The properties of a stack 24 behave exactly like the values 38 of a card 22 due to the inheritance relationship 30.

Figure 5:
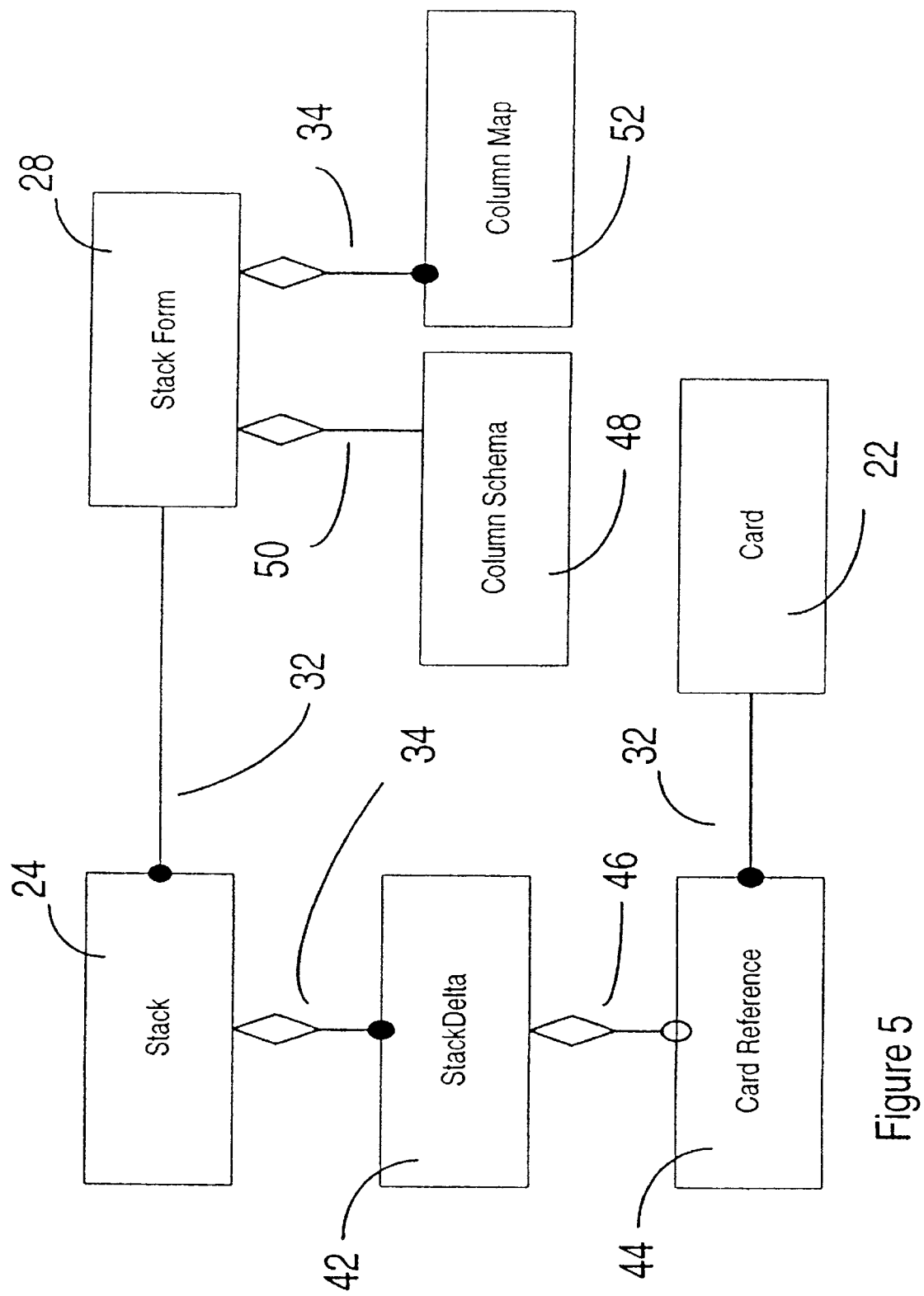
FIG. 5 is an object relationship diagram showing the support structures that relate to stacks and stack forms.

As depicted in FIG. 5, the stack form 28 has one column schema 48 as indicated by the aggregate relationship 50 and a plurality of column maps 52 represented by the one-to-many aggregate relationship 34.

The column schema 48 describes a plurality of columns associated with each stack 24 based on the stack form 28. Each column represented by the column schema constitutes a category of information. Using the e-mail example, a column schema 48 for a stack 24 containing both receive and sent messages would describe five columns: name, time, date, readFlag and subject.

The column map 52 establishes a relationship between a stack form 28 and a card form 26. This relationship implies that a stack 24 based on the stack form 28 may logically contain cards 22 based on the card form 26. Moreover, the column map 52 establishes the mapping between the value specifications 40 of the card form 26 and the columns of the stack form 28. Continuing the e-mail example, one will notice that the from value of a received e-mail card is mapped to the name column while the to value of a sent e-mail card is mapped to the same column. Value specification for the values time, date, readFlag and subject would map directly to their column schema 48 counterparts.

The stack 24 includes a plurality of stack deltas 42 as indicated by the one-to-many aggregate relationship 34. Each stack delta 42 represents an operation on the stack 24 with respect to a card 22. There are three such operations: add, modify and remove. Each stack delta 42 refers to a card reference 44 as indicated by the aggregate relationship 46. In turn, each card reference 44 refers to a card 22 by the many-to-one relationship 32. In other words, for each stack delta 42, there is one card reference 44, that refers to a card 22. Each card 22 may be referred to by many card references 44; therefore, a card 22 can be associated with one or more stacks 24. The add operation indicates that the card 22 is being logically added to the stack 24. The modify operation indicates that the card 22 has changed with respect to the stack 24. The remove operation indicates that the card 22 has been logically removed from the stack 24. Note, removing a card 22 from a stack 24 does not cause the card to be deleted, it only results in breaking the logical relationship between the card and the stack.

In the e-mail example, a stack delta would be applied to the e-mail stack when a new mail message is received. This stack delta 42 would refer to the e-mail message card 22 via an unique card reference 44 and is marked as an add operation. As the user reads the e-mail message, its readFlag is changed from false to true as described above. This change would result in a card delta 36 being applied to the card 22. Additionally, a stack delta 42 marked as a modify operation would need to be added to the stack 24 to make observers of the stack aware of the card's changing. This modify stack delta would refer to the original card 22 via a unique card reference 44. Once the user had read the mail message and decided to delete it, a third stack delta 42 is applied. The delete stack delta 42 indicates that the card 22 has been logically removed from the stack 24. Again, this delta refers to the same card 22 via a unique card reference 44.

By maintaining the history of add, modify and remove operations on a stack 24 with respect to contained cards 22, it is possible for the client database 14 to maintain an accurate representation of the stack 24 by requesting stack deltas 42 from the server database 12 via the broker 16.

The present invention uses the Basic Encoding Rules (BER) for encoding Abstract Synatx Notation One (ASN.1) to encode database objects for persistent storage and network transfer. The ASN.1 format is recognized by the International Standards Organization (ISO). Both ASN.1 and BER were developed and standardized by CCITT (X.209) and the International Standards Organization (ISO 8825). Both standards are well known in the trade and employed in the construction of several network protocols.

Because of the inheritance relationships 30 shown in FIG. 3, database objects 20 can all share common data elements: key, owner and observers. Collectively, these shared data elements are referred to as a database object 20 (DBObject) header. FIG. 6.1 shows the schematic and ASN.1 representation of a DBObject header. The key data element defines the well-known name of the object. The owner data element is an encoded well-known name of another DBObject 20 derivative that is the logical owner of the present object 20. The observers data element provides a list of zero or more applications 8, 18 that are interested in being notified when the present object 20 receives a new delta 36, 42. (In FIG. 6.1, the schematic depicts two observers.)

Referring to FIG. 6.2, the encoding of a DBObject's 20 header consists of five steps. First, an ASN.1 SEQUENCE to contain the header: header sequence is constructed. (In ASN.1, a SEQUENCE is an ordered collection of ASN.1 encodings that are logically related.) Next, the key (well-known name) of the object at hand is encoded as an ASN.1 OCTET STRING and added to the header sequence. (In ASN.1, an OCTET STRING is a string of 8 bit ASCII characters.) Next, an ASN.1 SEQUENCE that is to contain the registered observers of the present DBObject is constructed: observer sequence. Next, the registered observers are enumerated, individually encoded as ASN.1 OCTET STRINGS and added to the observer sequence. Finally, the observer sequence is added to the header sequence. A DBObject's 20 header can be decoded by following the same logic in reverse.

Referring to FIG. 7.1, a card's 22 encoding includes the following data elements: a DBObject header and a sequence of card deltas 36. In the present invention, the preferred ordering of card deltas 36 within a card's 22 encoding is chronological order (oldest first). (In FIG. 7.1, the schematic depicts four deltas.)

Referring to FIG. 7.2, there are five steps involved in encoding a card 22. First, an ASN.1 SEQUENCE to contain the card 22 is constructed: card sequence. Next, the DBObject 20 header is encoded and added to the card sequence. Next, an ASN.1 SEQUENCE to contain the deltas 36 applied to the card 22 is constructed: card delta sequence.

Next, the card deltas are enumerated, individually encoded and added to the card delta sequence. Finally, the card delta sequence is added to the card sequence. A card's 20 encoding can be decoded by following the same logic in reverse.

Referring to FIG. 8.1, a card delta's 36 encoding includes a sequence of values 38. (In FIG. 8.1 the schematic depicts two values.)

Referring to FIG. 8.2, there are four steps involved in encoding a card delta 36. First, an ASN.1 SEQUENCE to contain the card delta 36 is constructed: card delta sequence. Next, an ASN.1 SEQUENCE to contain the values 38 of the card delta 36 is constructed: value sequence. Next, the values 38 of the card delta 36 are enumerated, individually encoded and added to the value sequence. Finally, the value sequence is added to the card delta sequence. A card delta's 36 encoding can be decoded by following the same logic in reverse.

Referring to FIG. 9.1, a card form's 26 encoding includes the following encoded data elements: a DBObject header and a sequence of value specifications 40. (In FIG. 9.1 the schematic depicts four value specifications.)

Referring to FIG. 9.2, there are four steps involved in encoding a card form 26. First, an ASN.1 SEQUENCE to contain the card form 26 is constructed: card form sequence. Next, the DBObject header sequence is constructed and added to the card form sequence. Next, an ASN.1 SEQUENCE to contain the value specifications 40 of the card form 26 is constructed: value specification sequence. Next, the value specifications 40 of the card form 26 are enumerated, individually encoded and added to the value specification sequence. Finally, the value specification sequence is added to the card form sequence. A card form's 26 encoding can be decoded by following the same logic in reverse.

FIGS. 10.1 through 10.7 depict the present invention's schematic and preferred ASN.1 encoding for particular general purpose value specifications 40. In each case, the individual elements of the value specifications 40 are encoded into a sequence that represents the encoding of the value specification.

Referring to FIG. 10.1, each value specification 40 has a common header that consists of a tag (a symbolic name) encoded as an ASN.1 OCTET STRING. This encoded tag is further encoded within another ASN.1 SEQUENCE that represents the value specification header: VSHeader.

Referring to FIG. 10.2, an integer type is represented by a header and an optional integer that represents the default value of an associated integer value. If the author of an integer value specification does not wish to impose a default value, the default element may be encoded as an ASN.1 NULL. (In ASN.1, NULL is a primitive type that represents no value or the lack of a value where one might be expected.) Otherwise, the default value is encoded as an ASN.1 INTEGER. (In ASN.1, integer values are encoded using the INTEGER primitive.)

Referring to FIG. 10.3, a floating-point type is represented by a header and an optional integer that represents the default value of an associated floating-point value. If the author of a floating-point value specification does not wish to impose a default value, the default element may be encoded as an ASN.1 NULL. Otherwise, the default value is encoded as an ASN.1 INTEGER.

Referring to FIG. 10.4, a boolean type is represented by a header and an optional boolean that represents the default value of an associated boolean value. The required default value is encoded as an ASN.1 APPLICATION IMPLICIT NULL with a tag of zero for false or a tag of one for true.

Referring to FIG. 10.5, a date type is represented by a header and two additional data elements: default and preset. The default data element represents the source of the default value: preset, none or current. If the default value is preset, the preset data element contains an integer representation of a date that is to serve as the default value of an associated date value. This value is encoded as an ASN.1 INTEGER representing the number of milliseconds (thousandths of seconds) since midnight Jan. 1, 1970 Coordinated Universal Time. If the default value is none, no default value is defined. If the default value is current, an associated value is initialized to the current date at its time of instantiation. If the default value is either none or current, the preset element has no meaning. The preferred encoding of the preset element in this case is as an ASN.1 NULL.

Referring to FIG. 10.6, a time type is represented by a header and two additional data elements: default and preset. The default data element represents the source of the default value: preset, none or current. If the default value is preset, the preset data element contains an integer representation of a time that is to serve as the default value of an associated time value. This value is encoded as an ASN.1 INTEGER representing the number of milliseconds since midnight Coordinated Universal Time. If the default value is none, no default value is defined. If the default value is current, an associated value is initialized to the current time at its time of instantiation. If the default value is either none or current, the preset element has no meaning. The preferred encoding of the preset element in the case is as an ASN.1 NULL.

Referring to FIG. 10.7, a string type is represented by a header and four additional data elements: makeUpper, type, default and preset. The makeUpper data element is a flag that indicates that the associated string value should be forced to an upper case representation. The type data element indicates the type of string represented: nornal or password. Using this type applications 8 18 may make provisions for handing sensitive password data. The default data element represents the source of the default value: preset, none or guid. If the default data element is preset, the preset data element contains a string representation of a value that is to serve as the default value of an associated string value. If the default data element is none no default value is defined. If the default data element is guid, a universally unique string identifier is generated as a default for the associated value at its time of instantiation. If the default data element is either none or guid, the preset element has no meaning. The preferred encoding of the preset element in this case is as an ASN.1 NULL.

Referring to FIG. 11.1, a stack's 24 encoding includes the following encoded data elements: DBObject header, card encoding and a sequence of stack deltas 42. Since a stack 24 is derived (inherited) from a card 22, the card 22 elements must be encoded in the stack for accurate representation of the stack's 24 properties (values). (In FIG. 11.1 the schematic depicts four deltas within the stack delta sequence.)

Referring to FIG. 11.2, there are six steps involved in encoding a stack 24. First, an ASN.1 SEQUENCE to contain the stack 24 is constructed: stack sequence. Next, the DBObject header of the stack is encoded and added to the stack sequence. Next, the card sequence is encoded and added to the stack sequence. Next, an ASN.1 SEQUENCE to contain the deltas of the stack is constructed: stack delta sequence. Next, the deltas of the stack are enumerated, individually encoded and added to the stack delta sequence. Finally, the stack delta sequence is added to the stack sequence. In the present invention, the preferred ordering of stack deltas 42 within the stack delta sequence is chronological order (oldest first). A stack's 24 encoding can be decoded by following the same logic in reverse.

Referring to FIG. 12.1, a stack delta's 42 encoding includes two data elements: an operation and a card reference. The operation data element can be one of three values: add, modify or remove. The operation indicates the disposition of the card 22 referred to by the card reference data element with respect to the stack delta's 42 stack 24.

Referring to FIG. 12.2, there are three steps involved in encoding a stack deltas. First, a sequence to contain the stack delta 42 is constructed: stack delta sequence. Next, the operation is encoded as an ASN.1 INTEGER and added to the stack delta sequence. Finally, the key of the associated card is encoded as an ASN.1 OCTET STRING and added to the stack delta sequence.

Referring to FIG. 13.1, a stack form's 28 encoding includes four elements: a DBObject header, a card form sequence, a column schema and a column map. (In FIG. 13.1, the schematic depicts a column schema defining two columns and a column map containing two column map entries. Each column map entry contains two map items mapping values of the associated card form to each of the two columns.)

Referring to FIG. 13.2, there are five steps involved in encoding a stack form 28. First, an ASN.1 SEQUENCE to contain the stack form 28 is constructed: stack form sequence. Next, the DBObject header sequence is encoded and added to the stack form sequence. Next, the card form sequence is encoded and added to the stack form sequence. Next, the column schema is encoded as a sequence and added to the stack form sequence. Finally, the column map is encoded as a sequence and added to the stack form sequence.

The following steps are taken to encode the column schema 48. First, a sequence to contain the column schema is constructed: column schema sequence. Next, the columns of the stack form 28 are enumerated. Next, for each column of the column schema, the zero-based index of the column is encoded as an ASN.1 INTEGER and wrapped in a sequence encoding: column sequence. Finally, each column sequence is added to the column schema sequence.

The following steps are taken to encode the column map 52. First, an ASN.1 SEQUENCE to contain the column map is constructed: column map sequence. Next, the column map entries are enumerated, individually encoded and added to the column map sequence.

The following steps are taken to encode a column map entry. First, an ASN.1 SEQUENCE to contain the column map entry is constructed: column map entry sequence. Next, the key (well-known name) of the card form 26 associated with the column map entry is encoded as an ASN.1 OCTET STRING. Next, the column map items associated with the column map entry are enumerated, individually encoded and added to the column map entry sequence.

The following steps are taken to encode a column map item. First, an ASN.1 SEQUENCE to contain the column map item is constructed: column map item sequence. Next, the zero based index of the associated column is encoded as an ASN.1 INTEGER and added to the column map item sequence. Finally, the zero based value specification index of the associated value is encoded as an ASN.1 INTEGER and added to the column map item sequence.

A stack form's 28 encoding can be decoded by following the same logic in reverse.

The encoding of the four primary data structures and their various support structures provides a means of effectively packing database information into units for transport. However, it is in the transporting of these encoding structures that the primary benefit of the present invention is realized. As previously stated, the communications between the client database 14 and the server broker 16 are pull oriented. That is to say, the client 2 makes a request to pull information from the server database 12 via its broker 16. The pulling of information is achieved via four synchronous request/response pairs: add, delete, get and refresh. In each case, the request is sent by the client database to the broker 16, and the broker responds in kind to the request.

The add request has three varieties: add object, add stack delta and add card delta.

Figure 14A:
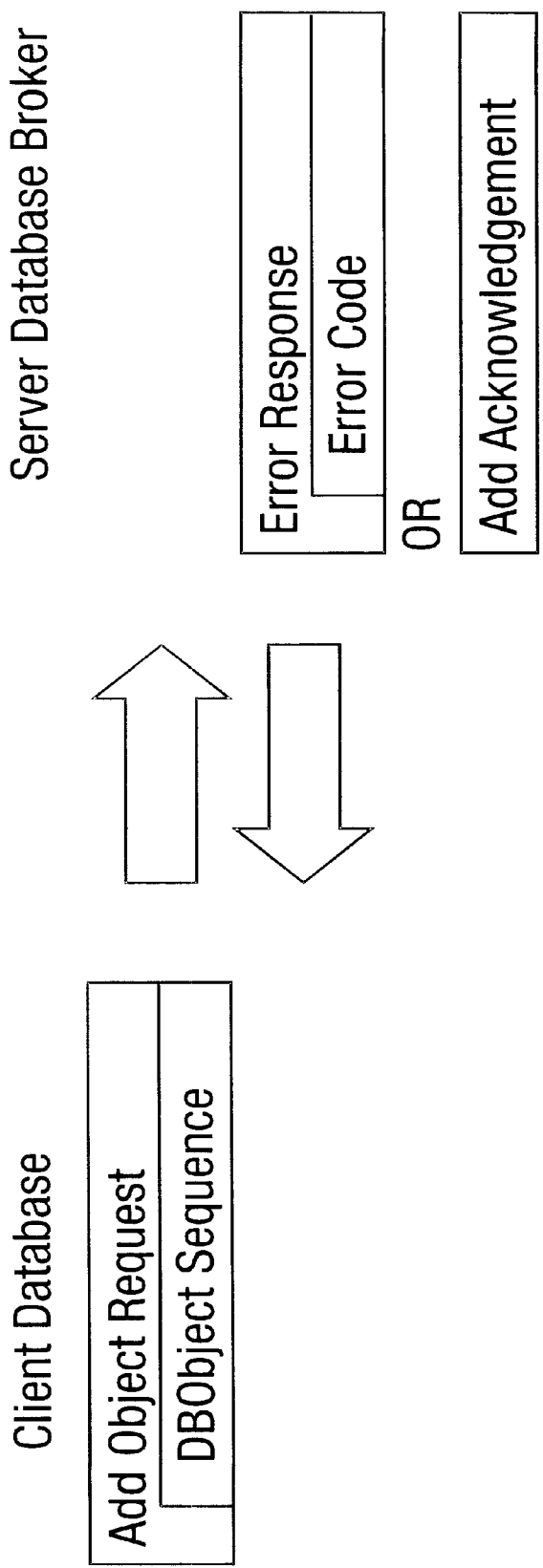
FIG. 14 is the schematic and ASN.1 representations of an add card request and response.

Referring to FIG. 14, the add object request is used to add a new object (one created on the requesting client 2) to the server's database 12. The add object request consists of an ASN.1 SEQUENCE with an encoded DBObject derivative as its content. In response to the request, the broker 16 will respond with one of two possibilities: an error response or an acknowledgement.

The structure of an error response is common across all request/response pairs; however, the possible error codes vary according to the request. In the case of the add object request, there is the possibility for two error codes: authentication and exists. The authentication error code is returned if the client 2 has not been authenticated. (Authentication is an element of the protocol that neither significantly benefits nor adversely affects bandwidth utilization; therefore, the specific method of authentication is not discussed here.) The exists error code is returned if an object with the same name as the object being added already exists. Error responses are returned as an ASN.1 INTEGER encoded in an IMPLICIT ASN.1 SEQUENCE with a tag of zero.

The acknowledgment response is simply an IMPLICIT ASN.1 NULL with a tag of one. This response indicates that the object associated with the request was successfully created in the server's database 12.

The object associated with an add object request can only have one delta 36, 42. Therefore, the object representation as it exists on the client is the most compact representation for transmission.

Figure 15A:
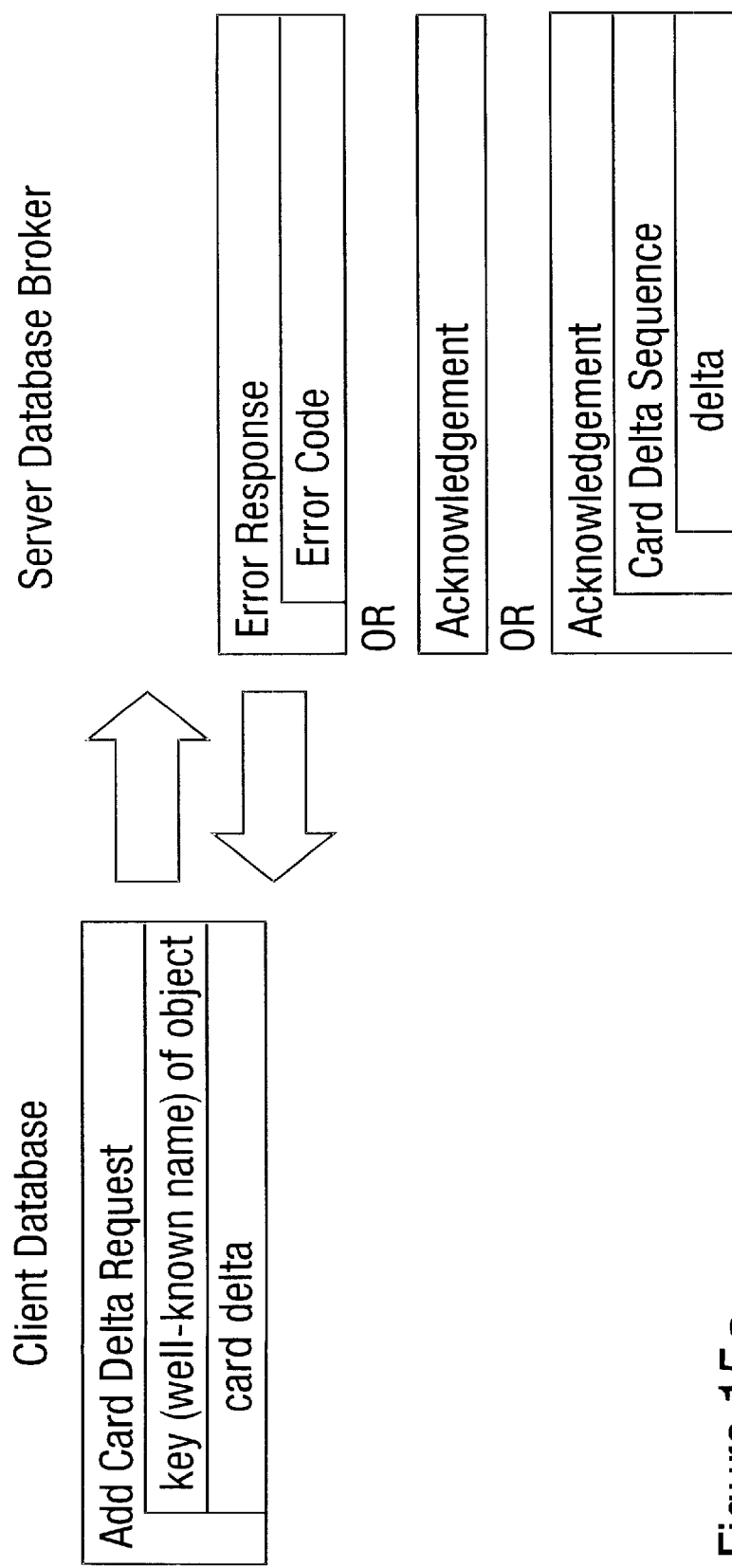
FIG. 15 is the schematic and ASN.1 representations of an add card delta request and response.

Referring to FIG. 15, the add card delta request is used to add a new card delta 36 to an existing card 22. Therefore, the add card delta is in effect a modify operation on a card 22. The add card delta request consists of an ASN.1 SEQUENCE. Two data elements are encoded within this sequence: a key and a card delta 36. The key (well-known name) of the object is encoded as an ASN.1 OCTET STRING and the card delta 36 is encoded as described above.

The broker 16 can reply with two possible error codes: authentication and exists. In this case, exists error code refers to the fact that the named object, the card corresponding to the delta, does not exist in the server's database.

The broker 16 can respond with one of two forms of acknowledgement: simple or complex. The simple form of the acknowledgement is an IMPLICIT ASN.1 NULL with a tag of one. This form of the acknowledgement indicates that the card delta 36 was successfully applied to the named card 22 in the server database 12. The complex form of the acknowledgement is an IMPLICIT ASN.1 SEQUENCE with a tag of one. This form of the acknowledgement indicates that the card delta 36 was successfully applied to the named card 22; however, another client 2 (or the server 4) had already applied the delta index indicated. The sequence in this form contains an ASN.1 SEQUENCE of card deltas 36. These card deltas 36 represent the missing deltas (those not known to the requesting client) and lastly, the client's own delta.

When more than one card delta 36 is returned in any broker 16 response, there is an opportunity to compress values into a single card delta 36. While it is necessary for the server database 12 to maintain a complete history of card deltas 36, it need not be a requirement for a client. For example, consider the case were a client does a get of a card 22 at delta level zero. Next, it adds a delta 36 via the add card delta request. This delta 36 would be identified as level one. If during the interim between the get and the add card delta two card deltas 36 had been added (level one and two), the broker 16 would be expecting delta level three rather than delta level one. Recognizing the scenario at work, the broker 16 renumbers the delta 36 received from the client 2 to level three and applies it to the database 12. Rather than responding to the client with the two missing deltas 36 and the newly renumbered delta (three in total), the broker 16 sends a composite delta 36 (reflecting the net result of applying all three deltas) with the delta level of the card: three. From the client database 14 point of view, the result is the same; however, this reduction in deltas 36 is beneficial to bandwidth utilization.

Figure 16A:
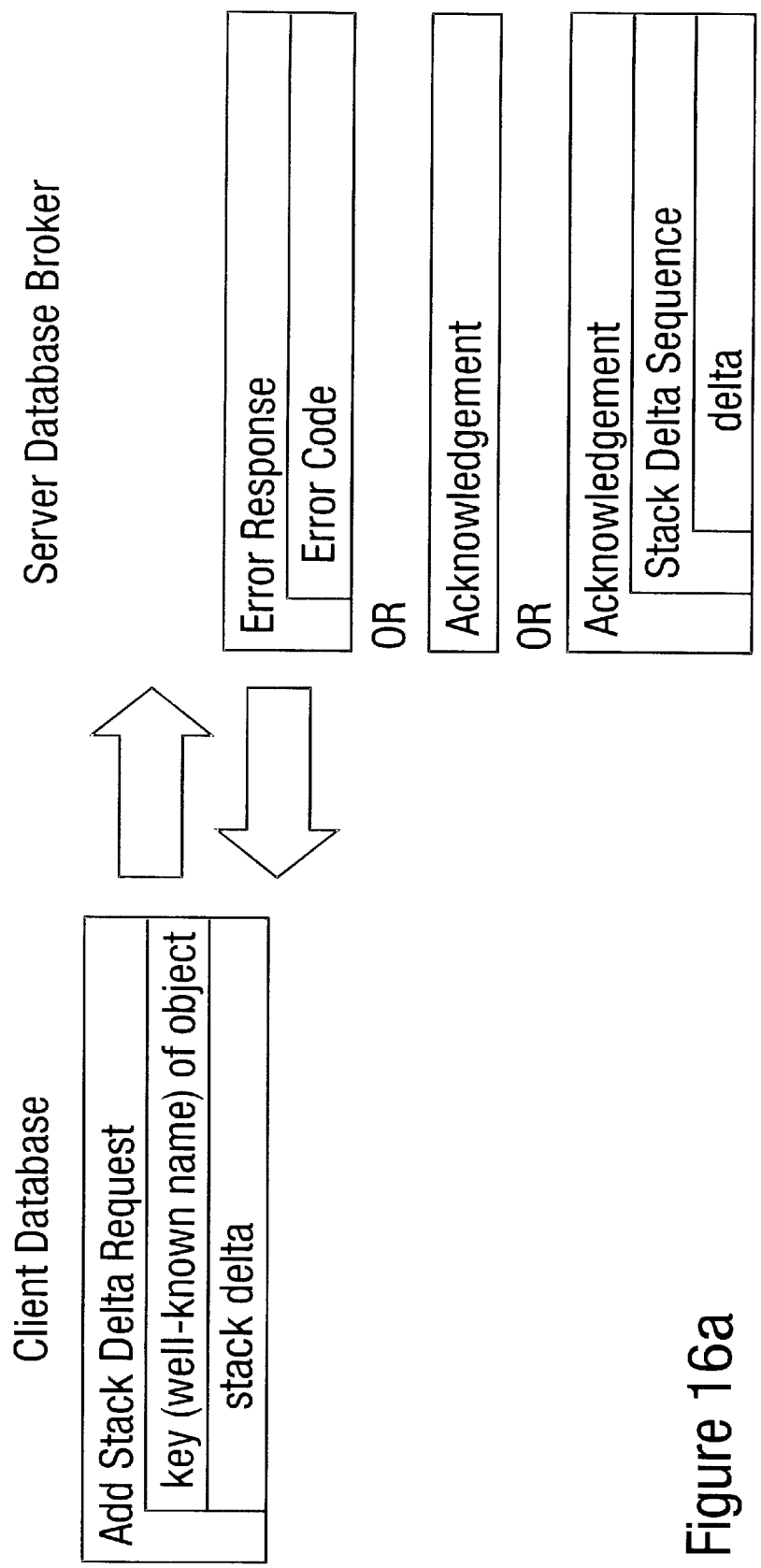
FIG. 16 is the schematic and ASN.1 representations of an add stack delta request and response.
Figure 17:
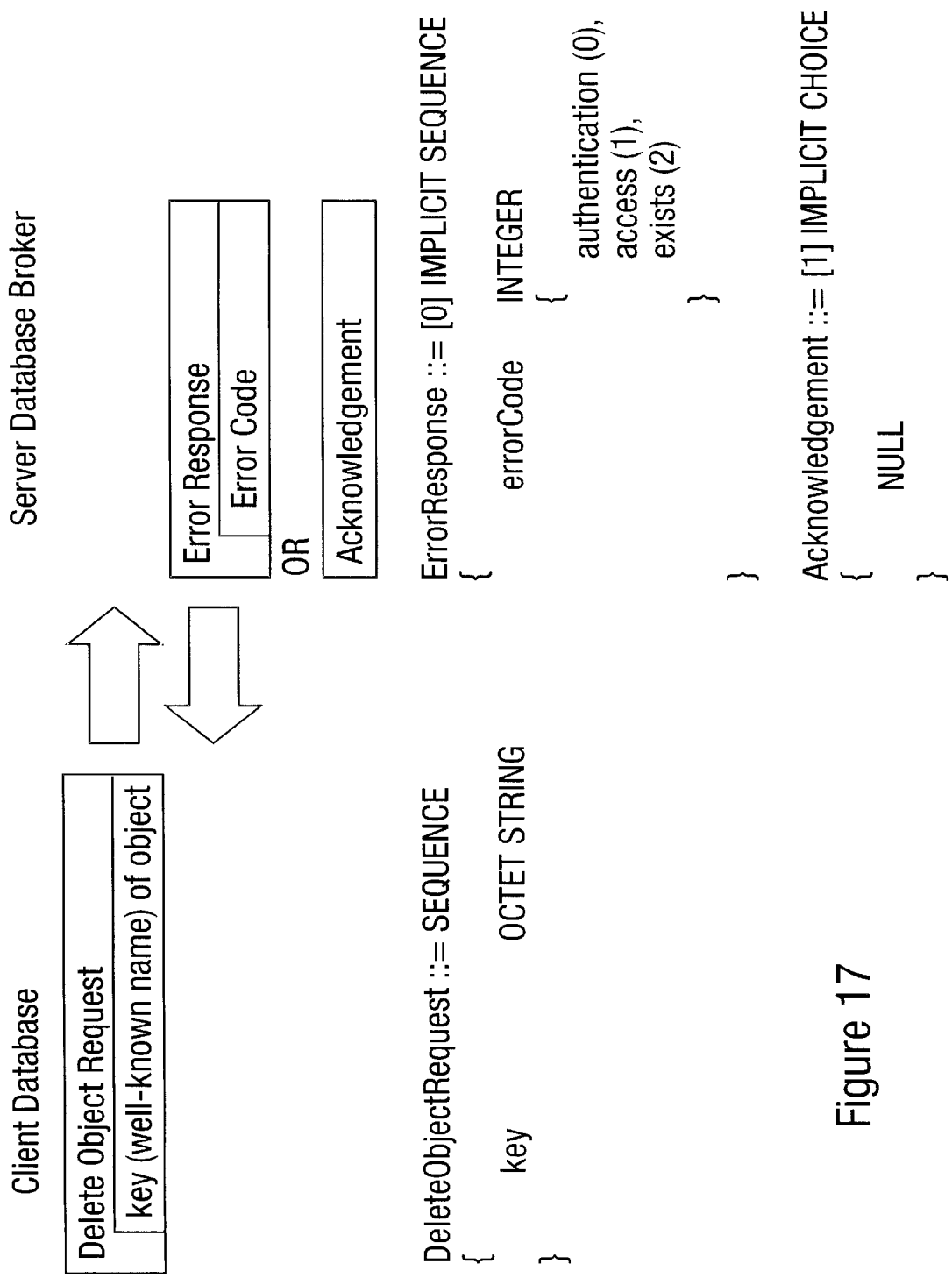
FIG. 17 is the schematic and ASN.1 representations of a delete object request and response.

Referring to FIG. 16, the add stack delta request is used to add a new stack delta 42 to an existing stack 24. Therefore, the add stack delta is in effect a modify operation on the stack 24. The add stack delta request consists of an ASN.1 SEQUENCE. Two data elements are encoded within this sequence: a key and a stack delta. The key (well-known name) of the object is encoded as an ASN.1 OCTET STRING and the stack delta 42 is encoded as described above.

The broker 16 can reply with two possible error codes: authentication and exists. In this case, exists again refers to the fact that the named object, the stack corresponding to the delta, does not exist in the server's database 12.

The broker 16 can also respond with one of two forms of acknowledgment: simple or complex. The simple form of the acknowledgment is an IMPLICIT ASN.1 NULL with a tag of one. This form of the acknowledgement indicates that the stack delta 42 was successfully applied to the named stack 24 in the server database 12. The complex form of the acknowledgement is an IMPLICIT ASN.1 SEQUENCE with a tag of two. This form of the acknowledgment indicates that the delta 42 was successfully applied to the named stack 24; however, another client 2 (or the server 4) had already applied the delta index indicated by the delta 42. The response sequence in this case contains an ASN.1 SEQUENCE of stack deltas 42. These stack deltas represent the missing deltas (those not known to the requesting client 2) and lastly, the clients own delta 42.

When more than one stack delta 42 is returned in any broker response, there is an opportunity to reduce the number of deltas returned. While it is necessary for the server database 12 to maintain a complete history of stack deltas 42, it need not be a requirement for a client 2. For example, consider the case were a client 2 does a get of a stack 24 at delta level two. Next it adds a delta 42 via the add stack delta request. This delta would be identified as level three. If during the interim between the get and the add stack delta two stack deltas 42 had been added (level three and four), the broker 16 would be expecting delta level five rather than delta level three. Recognizing the scenario at work, the broker 16 renumbers the delta 42 received from the client 2 to level five and applies it to the server database 12. Rather than responding to the client with the two missing deltas 42 and the newly renumber delta 42 (three in total), the broker sends a reduced set of deltas 42 (reflecting the net result of applying all three deltas) ending with the delta level of the stack: five. From the client database's 14 point of view, the result is the same; however, this reduction in deltas 42 is beneficial to bandwidth utilization.

The following two algorithms are considered by the broker 16 in its attempt to reduce the number of stack deltas 42. First, if multiple modify deltas 42 have been applied to the stack 24 with respect to the same object during the time in question, only the most recent delta 42 is placed in the response sequence. Second, if a remove delta 42 has been applied to the stack 24 with respect to the same object, no add or modify deltas 42 associated with that object are included in the response sequence. Third, if both an add and a remove delta 42 has been applied to the stack 24 with respect to the same object during the time in question, the remove delta is also not included in the response sequence.

Referring to FIG. 16, the delete object request is used to delete an existing object in the server's database 12. The delete object request consists of an ASN.1 SEQUENCE with the well-known name of the object encoded as an ASN.1 OCTET STRING. In response to the request, the broker will respond with one of two possibilities: an error response or an acknowledgement.

The broker 16 can reply with three possible error codes: authentication, access and exists. The access error code indicates that the requesting client does not have the appropriate level of access to perform the operation. Again, the exists error code refers to the fact that the object does not exist in the servers database.

If the delete object request is successfully processed by the broker, the broker will respond with a simple acknowledgement: an IMPLICIT ASN.1 NULL with a tag of one.

Figure 18A:
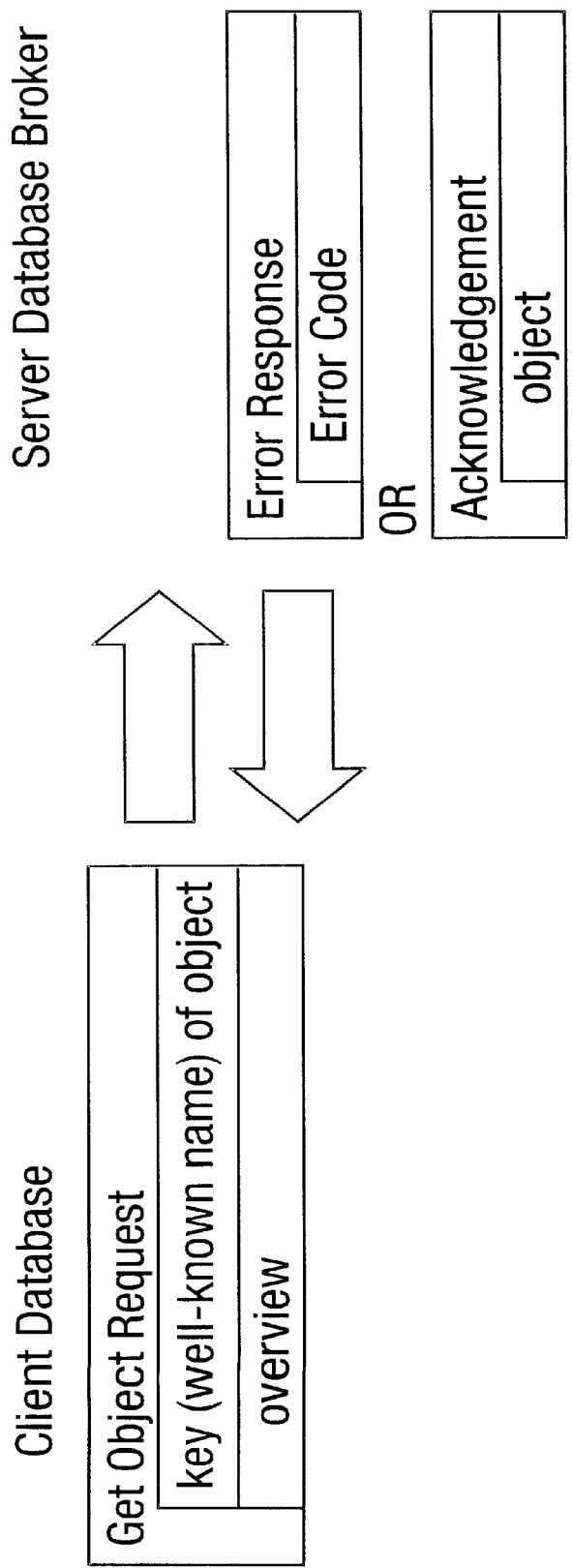
FIG. 18 is the schematic and ASN.1 representation of a get object request and response.

Referring to FIG. 18, the get object request is used to obtain an object that exists in the server's database 12. The get object request consists of an ASN.1 SEQUENCE with the well-known name of the object encoded as an ASN.1 OCTET STRING. In response to the request, the broker 16 will respond with one of two possibilities: an error response or an acknowledgement.

The broker can reply with three possible error codes: authentication, access and exists. The access error code indicates that the requesting client 2 does not have the appropriate level of access to perform the operation. Again, the exists error code refers to the fact that the object does not exist in the server's database 12.

The broker 16 can responds to a successful get object request with an ASN.1 SEQUENCE containing a card 12, card form 26, stack 24 or stack form 28 object encoding. The encoded object returned is the object named in the request.

Figure 19A:
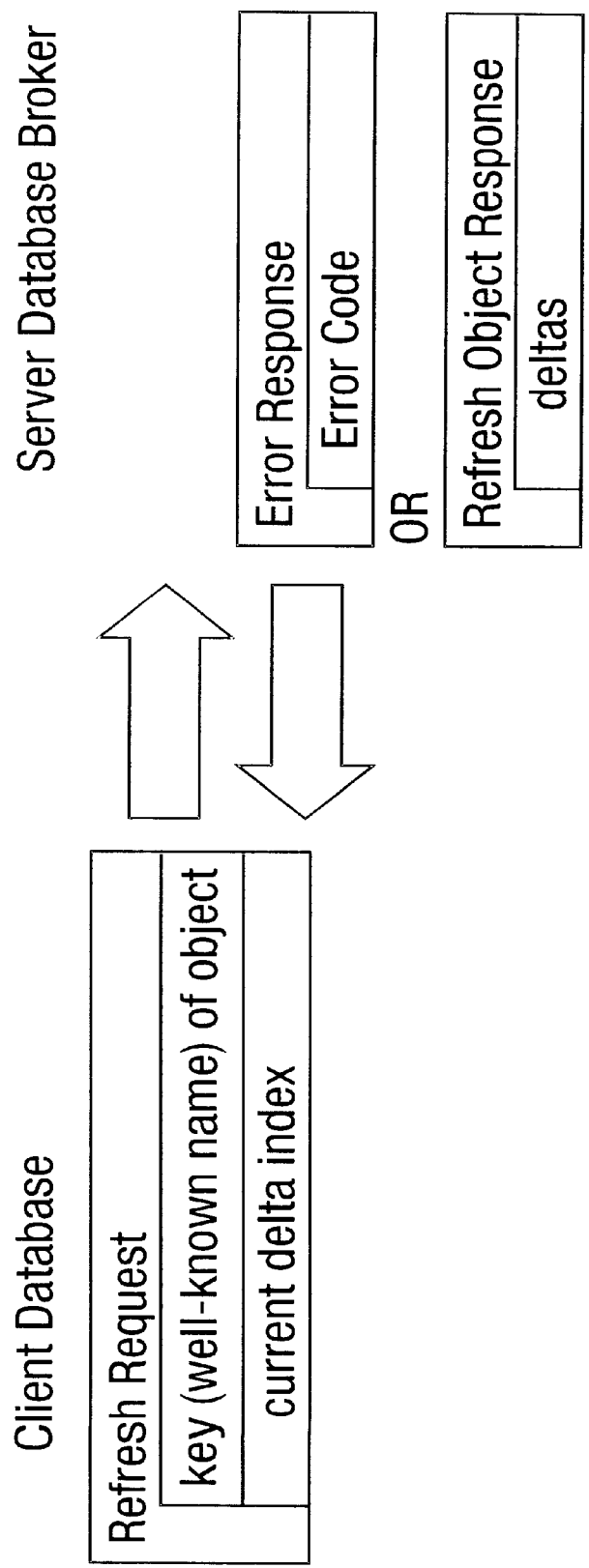
FIG. 19 is the schematic and ASN.1 representation of a refresh object request and response.

Referring to FIG. 19, the refresh object request is used to obtain an update to an object that exists in the server's database 12. This request is used when the client 2 has a version of the object at hand cached in its local database 14. The refresh object request consists of a SEQUENCE containing both the encoded well-known name of the object at hand and the most recent delta index known to the client. In response to the request, the broker 16 will respond with one of two possibilities: an error response or an acknowledgement.

The broker can reply to a refresh object request with one of four error codes: authentication, access, exists and unsupported. The access error code indicates that the requesting client 2 does not have the appropriate level of access to perform the operation. Again, the exists error code refers to the fact that the object does not exist in the server's database 16. The unsupported error code is returned if the broker does not support the refresh object request for the requested object type: only cards 22 and stacks 24 are supported.

The broker 16 can responds to a successful refresh object request with an IMPLICIT ASN.1 SEQUENCE with a tag of two containing an ASN.1 SEQUENCE of deltas 36 42: delta sequence. If the requested object were a card 22, the delta sequence would contain all card deltas 36 for the card 22 since the delta index indicated in the request. If the request object is a stack 24, the delta sequence would contain all stack deltas 42 for the stack 24 since the delta index indicated in the request. In either case, the broker 16 attempts to reduce the number of deltas 36 42 sent by applying the same reduction algorithms used in the add card delta and add stack delta responses.

In the event that no new deltas 36, 42 have been added to the requested object since the delta index requested, the broker could respond with an IMPLICIT ASN.1 NULL with a tag of one. This will be the client's indication that the request object is up to date.

The features described in the specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. A method of transferring information across a computer network, the method comprising the steps of:
    dividing the information into a plurality of cards and a plurality of card forms, each card including a plurality of values, and each card form corresponding to one of said cards and including a description of said values of a corresponding said card;
    providing a server with a server data base and a client with a client data base in the computer network;
    storing said cards, and said card forms in said server data base and said client data base;
    replacing the information in said server by attaching a card delta to one of said cards, said card delta indicating which information in said one card is to be replaced;
    transferring card deltas from said client data base to said server data base when said server data base is to be updated;
    transferring card deltas from said server data base to said client data base when said client data base is to be updated;
    providing a client application on said client, said client application reading from and writing to said client data base;
    providing a server application on said server, said server application reading from and writing to said server data base;
    said data bases performing information replacement as indicated in said card deltas and providing replacement information when a respective said application requests information stored in a corresponding said card;
    one of said data bases requesting additional said card deltas for one of said cards from the other said data base when a respective application of said one data base requests information included in said one card.

2. A method in accordance with claim 1, further comprising:
    transferring any additional said card deltas for one of said cards to one said data base from the other said data base when a respective application of said one data base requests information included in said one card.

3. A method in accordance with claim 1, further comprising:
    said requesting of said additional card deltas is based on said card deltas already known by said one data base.

4. A method in accordance with claim 1, further comprising:
    said card, said card form, and said card delta are encoded using the Basic Encoding Rules of Abstract Syntax Notion One.

5. A method in accordance with claim 1, further comprising:
    compressing a plurality of said card deltas into a single composite card delta in one said data base and transferring said composite card delta to another said data base.

6. A method of transferring information across a computer network, the method comprising the steps of:
    dividing the information into a plurality of cards and a plurality of card forms, each card including a plurality of values, and each card form corresponding to one of said cards and including a description of said values of a corresponding said card
    providing a server with a server data base and a client with a client data base in the computer network;
    storing said cards, and said card forms in said server data base and said client data base;
    replacing the information in said server by attaching a card delta to one of said cards, said card delta indicating which information in said one card is to be replaced;
    transferring card deltas from said client data base to said server data base when said server data base is to be updated;
    transferring card deltas from said server data base to said client data base when said client data base is to be updated;
    said card deltas include a sparsely populated array of values;
    said card deltas represent atomic changes applied to a respective said card;
    a current said value for a particular value index is represented by a most recent said card delta in which that said value is populated;
    said cards are referred to by a stack;
    said stack includes a data structure referred to as a stack delta;
    said stack delta includes an object reference and an operation that represents a relationship of an object to said stack;
    said object reference refers to one of said cards and said stack;
    said operation is one of add, modify and remove;
    a structure of a class of said cards is described by a data structure referred to as a card form;
    said card form defines an ordered zero based array of value specifications that define said values of said cards based on said card form.
    a structure of a class of said stack is described by a data structure referred to as a stack form;

said stack form defines a column schema and a column map;

said column schema defines columns of said stack form;

said column map is a collection of column map entries;

said column map entries define a relationship between said stack and said card forms;

said column map entries further define a mapping of said value specification of said card form to said columns of said stack form;

said column schema and said column map together indicate which said value specification of said card form indicate said values of said card based on said card form to be considered overview information;

said overview information is determined when details of said card are required.

7. A method in accordance with claim 6, wherein:

said card, said stack, said card form, said stack form, said card delta and said stack delta are encoded using the Basic Encoding Rules of Abstract Syntax Notion One for efficient storage and transfer.

8. A method in accordance with claim 6, further comprising:

compressing a plurality of said stack deltas into a sparsely populated list of said stack deltas to reduce a transmission length of said plurality of stack deltas.

9. A method in accordance with claim 6, further comprising:

adding one of a new said card, said card form, said stack and said stack form to one of said data bases;

adding said stack delta to said stack;

removing one of an existing said card, said card form, said stack and said stack form;

getting in full one of said card, said card form, said stack and said stack form;

retrieving a most recent said card delta of one of said cards;

retrieving a most recent said stack delta of said stack.

\* \* \* \* \*